United States Patent
Han et al.

(10) Patent No.: US 11,038,350 B2
(45) Date of Patent: Jun. 15, 2021

(54) METHOD AND DEVICE FOR MANAGING ENERGY CONSUMPTION BY USER RANKING

(71) Applicant: SAMSUNG ELECTRONICS CO., LTD., Suwon-si (KR)

(72) Inventors: Manjib Han, Seongnam-si (KR); Dongseop Lee, Suwon-si (KR); Keuncheol Lee, Siheung-si (KR); Sungmok Seo, Suwon-si (KR); Hyejung Cho, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 15/756,905

(22) PCT Filed: Sep. 1, 2016

(86) PCT No.: PCT/KR2016/009811
§ 371 (c)(1),
(2) Date: Mar. 1, 2018

(87) PCT Pub. No.: WO2017/039364
PCT Pub. Date: Mar. 9, 2017

(65) Prior Publication Data
US 2018/0254634 A1    Sep. 6, 2018

(30) Foreign Application Priority Data
Sep. 1, 2015    (KR) .......................... 10-2015-0123816

(51) Int. Cl.
G05B 15/02    (2006.01)
H02J 3/14    (2006.01)
(Continued)

(52) U.S. Cl.
CPC ................ *H02J 3/14* (2013.01); *G05B 15/02* (2013.01); *G06Q 10/04* (2013.01); *G06Q 50/06* (2013.01);
(Continued)

(58) Field of Classification Search
CPC .... H02J 3/14; H02J 13/0079; H02J 2003/143; H02J 2003/007; H02J 2003/003; G06Q 10/04; G06Q 50/06
See application file for complete search history.

(56) References Cited

U.S. PATENT DOCUMENTS 9,702,582 B2 * 7/2017 Svendsen ................ G05D 23/00
10,288,308 B2 * 5/2019 Svendsen ........... G05D 23/1902
(Continued)

FOREIGN PATENT DOCUMENTS

CN    102034143 A    4/2011
CN    102279297 A    12/2011
(Continued)

OTHER PUBLICATIONS

Dillahunt, Tawanna R., and Jennifer Mankoff. "Understanding factors of successful engagement around energy consumption between and among households." Proceedings of the 17th ACM conference on Computer supported cooperative work & social computing. 2014. (Year: 2014).*

(Continued)

*Primary Examiner* — Michael D Masinick
(74) *Attorney, Agent, or Firm* — Sughrue Mion, PLLC

(57) ABSTRACT

The present invention relates to a method and a device for managing energy consumption and, more particularly, to a method and a device for managing energy consumption for each time period so as to support a user's achieving of a target energy consumption rate for a predetermined time period. In addition, disclosed is a technology for a sensor (Continued)

network, machine to machine (M2M) communication, machine type communication (MTC), and the Internet of Things (IoT). The present disclosure can be utilized in an intelligent service (such as smart home, smart building, smart city, smart car or connected car, health care, digital education, retail business, security and safety-related services) based on the technology.

11 Claims, 19 Drawing Sheets

(51) Int. Cl.
  G06Q 50/06 (2012.01)
  H02J 13/00 (2006.01)
  G06Q 10/04 (2012.01)
  H02J 3/00 (2006.01)

(52) U.S. Cl.
  CPC ........... *H02J 13/0079* (2013.01); *H02J 3/003* (2020.01); *H02J 2203/20* (2020.01); *H02J 2310/14* (2020.01)

(56) References Cited

U.S. PATENT DOCUMENTS

| | | | | |
|---|---|---|---|---|
| 10,288,309 | B2* | 5/2019 | Svendsen | F24F 11/62 |
| 2008/0229226 | A1* | 9/2008 | Rowbottom | H05B 47/175 715/771 |
| 2010/0174419 | A1* | 7/2010 | Brumfield | G01R 22/10 700/295 |
| 2011/0282510 | A1 | 11/2011 | Son et al. | |
| 2012/0004872 | A1 | 1/2012 | Oh et al. | |
| 2012/0150454 | A1 | 6/2012 | Lee et al. | |
| 2013/0184968 | A1* | 7/2013 | Kumano | B60L 1/006 701/102 |
| 2013/0197708 | A1* | 8/2013 | Song | G05B 15/02 700/295 |
| 2013/0205175 | A1* | 8/2013 | Yamada | H04L 41/0631 714/57 |
| 2013/0218358 | A1* | 8/2013 | Yamada | H02J 13/00004 700/292 |
| 2014/0058806 | A1* | 2/2014 | Guenette | G06Q 30/0283 705/14.1 |
| 2014/0188295 | A1 | 7/2014 | Saito et al. | |
| 2015/0156597 | A1 | 6/2015 | Coler-Thayer et al. | |
| 2015/0167989 | A1 | 6/2015 | Matsuoka et al. | |
| 2016/0203146 | A1* | 7/2016 | Moll | G06Q 50/26 707/741 |
| 2016/0327294 | A1* | 11/2016 | Svendsen | F24F 11/62 |
| 2016/0344204 | A1* | 11/2016 | Steffes | H02J 13/00 |
| 2016/0370778 | A1* | 12/2016 | Kopp | G05F 1/66 |
| 2017/0074536 | A1* | 3/2017 | Bentz | F24F 11/30 |
| 2017/0191688 | A1* | 7/2017 | Svendsen | G05D 23/00 |
| 2017/0198931 | A9* | 7/2017 | Svendsen | F24F 11/62 |
| 2017/0205102 | A1* | 7/2017 | Svendsen | F24F 11/30 |
| 2018/0138742 | A1* | 5/2018 | Song | G06N 5/04 |
| 2018/0254634 | A1* | 9/2018 | Han | H02J 13/00028 |

FOREIGN PATENT DOCUMENTS

| | | | | |
|---|---|---|---|---|
| CN | 102313839 | A | 1/2012 | |
| CN | 102376026 | A | 3/2012 | |
| CN | 103917954 | A | 7/2014 | |
| CN | 103999114 | A | 8/2014 | |
| JP | 2004-170310 | A | 6/2004 | |
| JP | 2010-211419 | A | 9/2010 | |
| JP | 2011-238035 | A | 11/2011 | |
| KR | 10-2012-0066574 | A | 6/2012 | |
| KR | 101225073 | | * 6/2012 | ............ G01R 11/56 |
| KR | 10-2012-0076662 | A | 7/2012 | |
| KR | 20-0468498 | Y1 | 8/2013 | |
| KR | 10-2014-0052644 | A | 5/2014 | |
| KR | 10-2014-0077549 | A | 6/2014 | |
| KR | 10-1434296 | B1 | 8/2014 | |

OTHER PUBLICATIONS

Search Report dated Nov. 18, 2016, by the International Searching Authority in counterpart International Patent Application No. PCT/KR2016/009811 (PCT/ISA/210).

Written Opinion dated Nov. 18, 2016, by the International Searching Authority in counterpart International Patent Application No. PCT/KR2016/009811 (PCT/ISA/237).

Communication dated Apr. 1, 2021 issued by the State Intellectual Property Office of the P.R.China in application No. 201680050061.6.

* cited by examiner

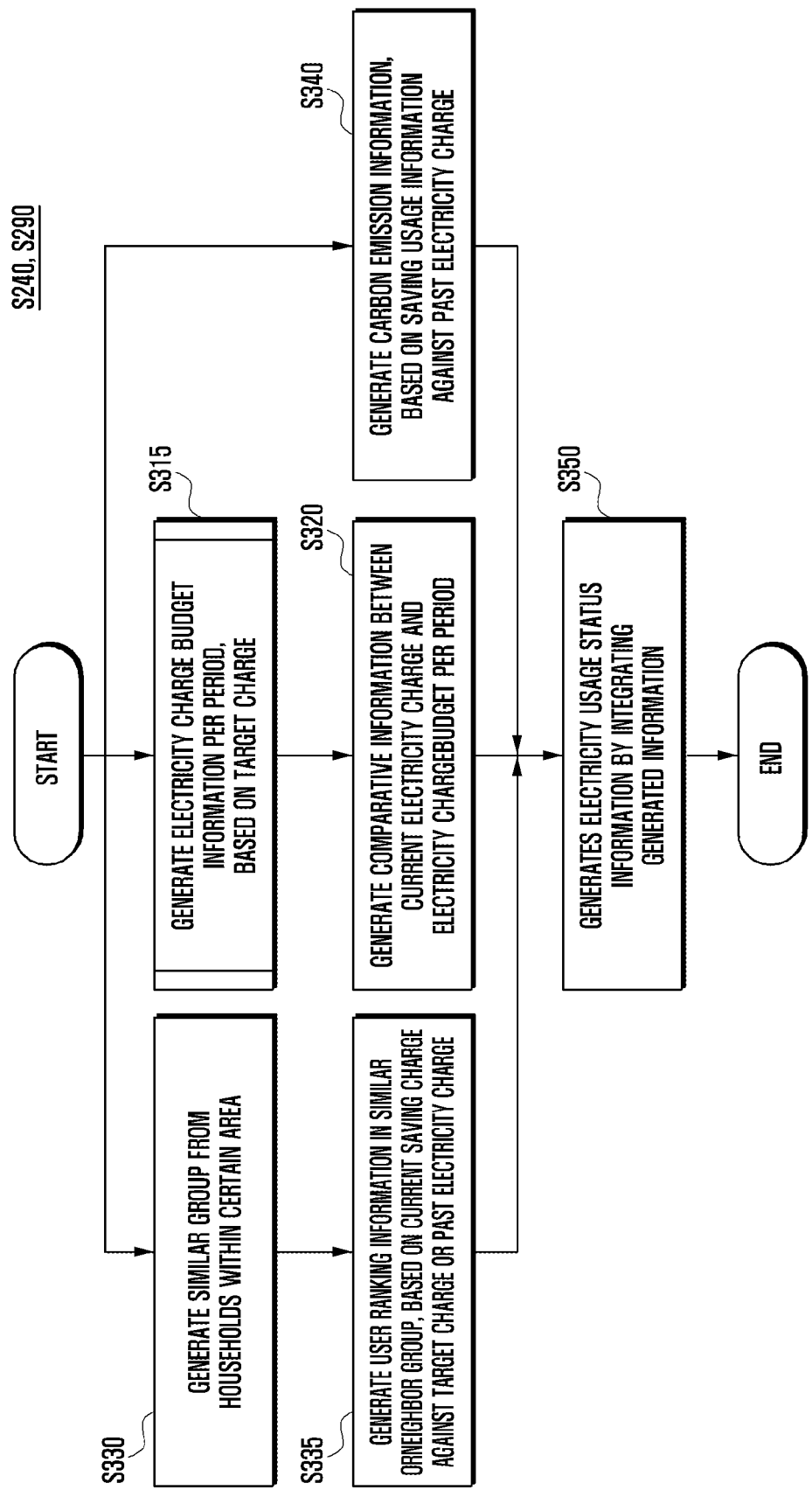

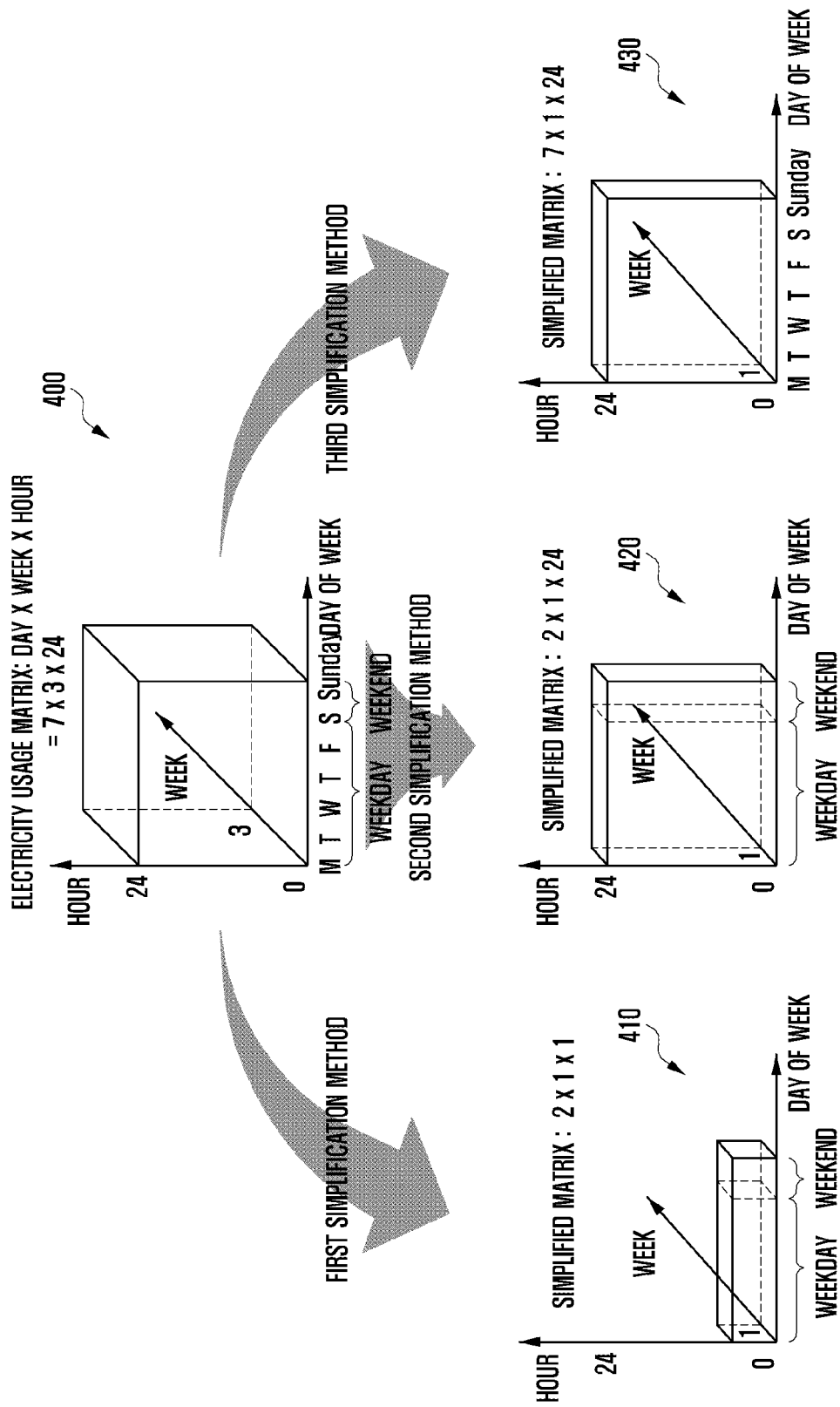

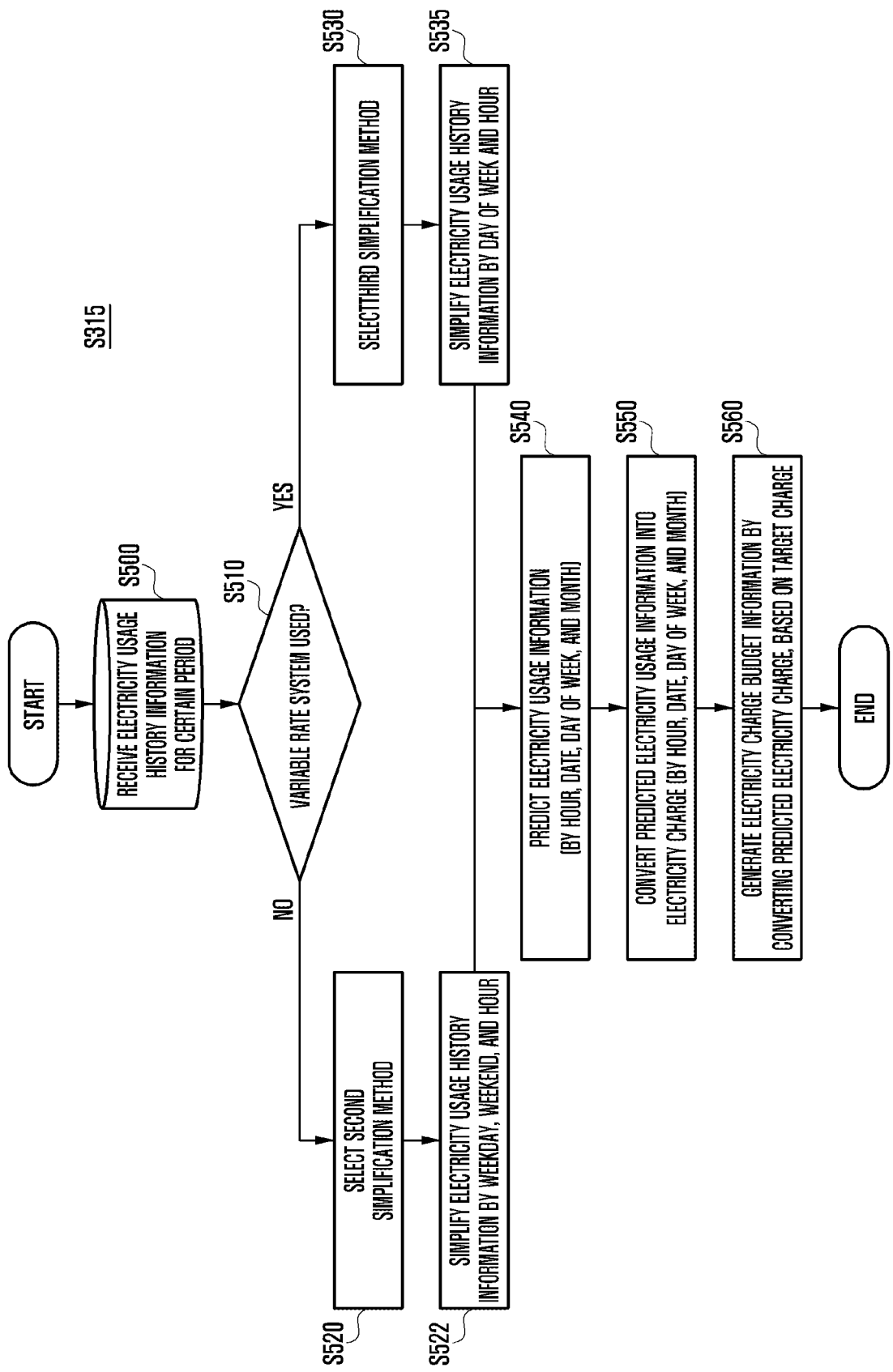

FIG. 11
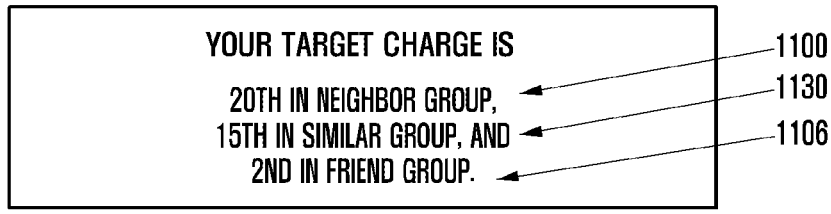
(a)
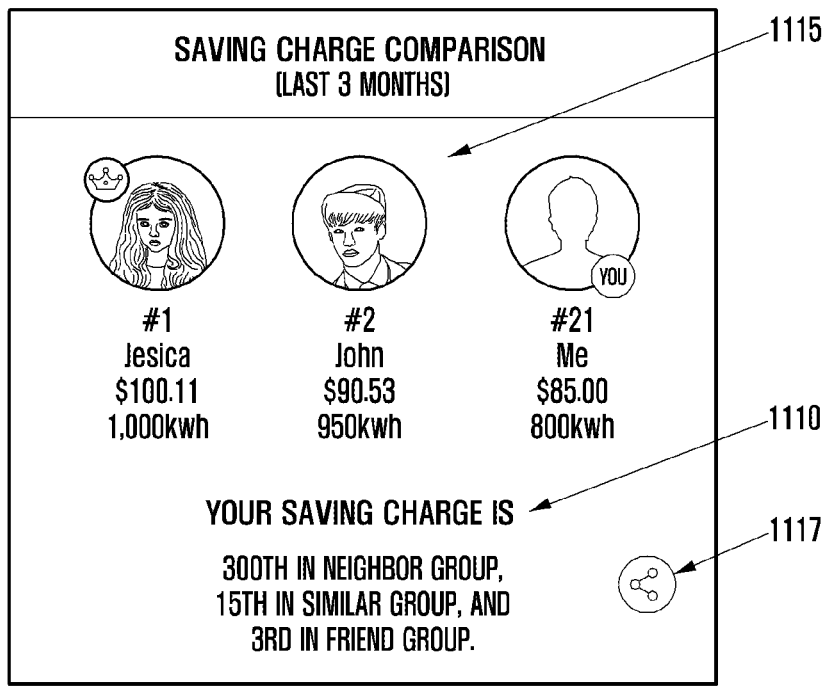
(b)
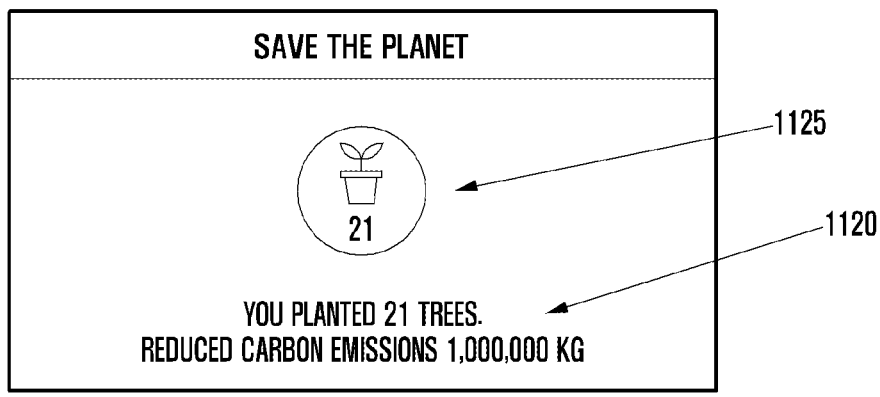
(c)

FIG. 12B
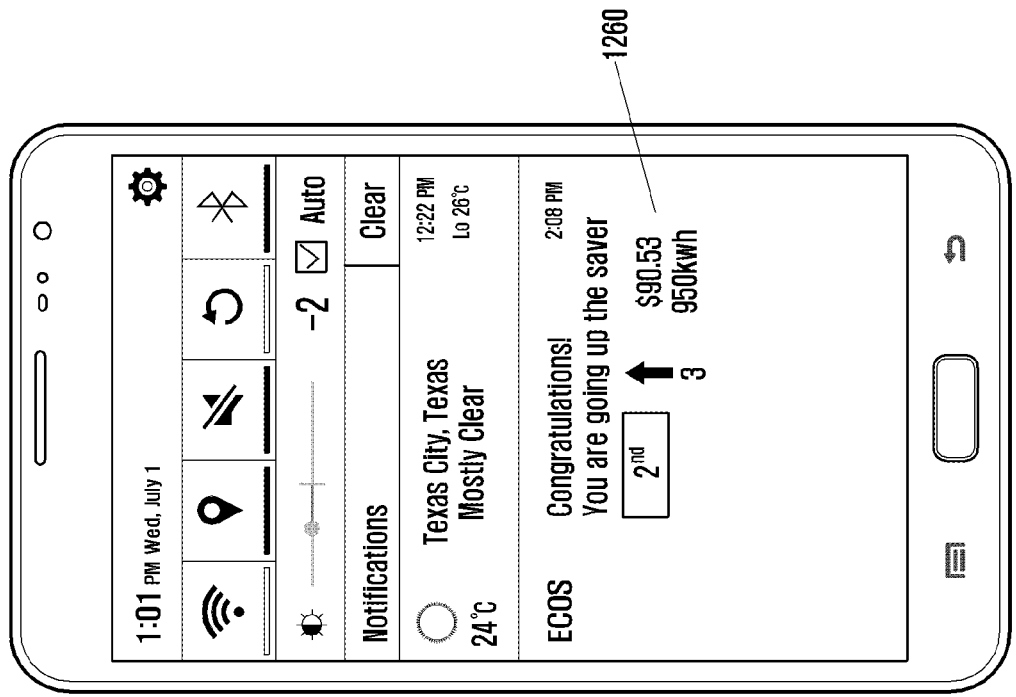
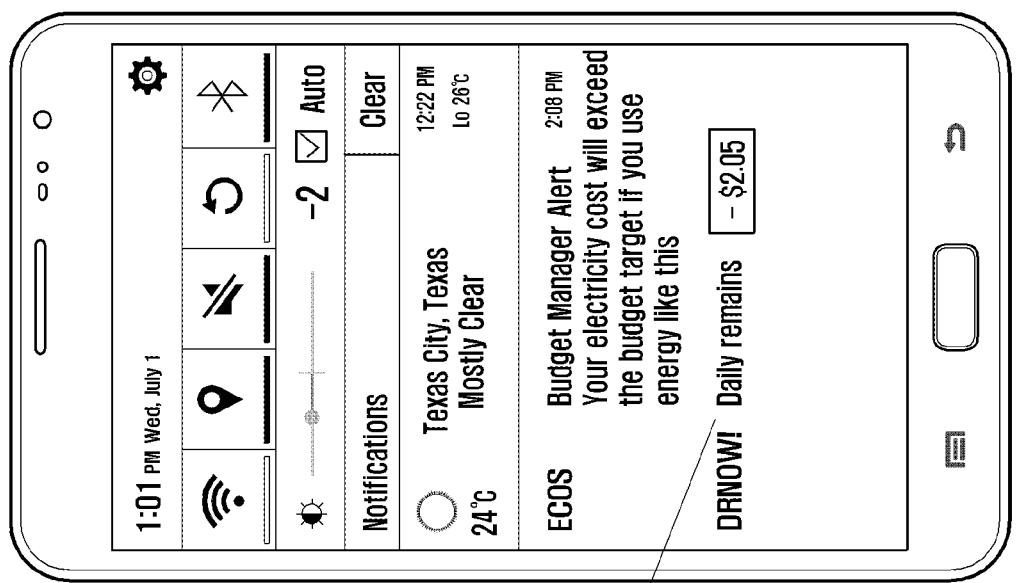

METHOD AND DEVICE FOR MANAGING ENERGY CONSUMPTION BY USER RANKING

TECHNICAL FIELD

The present invention relates to a method and device for managing energy consumption and, more particularly, to a method and device for managing energy consumption for each time period to assist a user in achieving a target energy consumption charge for a specific period.

BACKGROUND ART

The Internet is evolving from a human-centric network, in which humans generate and consume information, into an Internet of things (IoT) network in which distributed things exchange and process information. Further, the IoT technology combines with big data processing technology through connection with a cloud server or the like, thus developing into Internet of everything (IoE) technology. In order to realize the IoT, relevant technologies such as sensing technology, wired/wireless communication and network infrastructure, service interface technology, and security technology are being required. Thus, technologies such as a sensor network, machine-to-machine (M2M), and machine type communication (MTC) are now being studied.

In the IoT environment, an intelligent Internet technology (IT) service can be provided that collects and analyzes data generated from connected things and thereby creates new value in a human life. The IoT technology can be applied to fields of smart home, smart building, smart city, smart car or connected car, smart grid, health care, smart home appliance, and advanced medical service through the fusion of existing information technology (IT) and various industries.

Meanwhile, a typical method for managing energy consumption of energy consuming devices in a user's house is to compare monthly charges with each other. In other words, since the user merely uses fragmentary information such as already charged rates, the user has difficulty in managing the energy effectively. Therefore, there is a need of a method for managing energy consumption by subdivided periods, based on energy consumption related information that reflects the characteristics of the user, and on a user's target charge for a certain period.

DISCLOSURE OF INVENTION

Technical Problem

The present invention has been proposed in order to solve the above-described problems. Specifically, the present invention proposes a method for predicting an energy usage pattern for a certain period through energy usage history information and deriving a budget of an energy charge for each period based on a user's target charge for a certain period. In addition, the present invention proposes a method for providing and displaying, to and on a user terminal, current energy charge information compared with the derived budget of an energy usage charge for each period, and ranking information with a neighbor group with respect to energy saving information against past energy usage.

Solution to Problem

According to an embodiment of the present invention, a method for managing energy consumption at a server comprises steps of receiving user's target charge information for a specific period from a terminal; generating energy charge budget information for the specific period, based on user's energy usage history information received from a gateway and the target charge information; and transmitting the generated energy charge budget information to the terminal.

According to another embodiment of the present invention, a method for managing energy consumption at a terminal comprises steps of transmitting user's target charge information for a specific period to a server; identifying energy charge budget information for the specific period, based on the target charge information and user's energy usage history information; and displaying the energy charge budget information and user's current energy charge information on a display.

According to another embodiment of the present invention, a server for managing energy consumption comprises a transceiver configured to transmit and receive information; and a controller configured to control receiving user's target charge information for a specific period from a terminal, to control generating energy charge budget information for the specific period, based on user's energy usage history information received from a gateway and the target charge information, and to control transmitting the generated energy charge budget information to the terminal.

According to another embodiment of the present invention, a terminal for managing energy consumption comprises a transceiver configured to transmit and receive information; a display configured to display information necessary for managing the energy consumption; and a controller configured to control transmitting user's target charge information for a specific period to a server, to control identifying energy charge budget information for the specific period, based on the target charge information and user's energy usage history information, and to control displaying the energy charge budget information and user's current energy charge information on the display.

According to another embodiment of the present invention, a method for managing energy consumption at a terminal comprises steps of identifying information; and displaying an item corresponding to the identified information on a display, wherein the item corresponding to the identified information includes a first item corresponding to target charge information for a specific period inputted from a user, a second item corresponding to energy charge budget information at a specific time point, and a third item corresponding to user's energy charge information at the specific time point, wherein the second item is displayed on the basis of a ratio of the energy charge budget information at the specific time point to the target charge information, based on a position of the first item, and wherein the third item is displayed on the basis of a ratio of the user's energy charge information at the specific time point to the energy charge budget information at the specific time point, based on the second item.

According to another embodiment of the present invention, a terminal for managing energy consumption comprises a transceiver configured to transmit and receive information; a display configured to display information necessary for managing the energy consumption; and a controller configured to control identifying information, and to control displaying an item corresponding to the identified information on a display, wherein the item corresponding to the identified information includes a first item corresponding to target charge information for a specific period inputted from a user, a second item corresponding to energy charge budget information at a specific time point, and a third item corresponding to user's energy charge information at the specific time point, wherein the second item is displayed on the basis of a ratio of the energy charge budget information at the specific time point to the target charge information, based on a position of the first item, and wherein the third item is displayed on the basis of a ratio of the user's energy charge information at the specific time point to the energy charge budget information at the specific time point, based on the second item.

Advantageous Effects of Invention

According to embodiments of the present invention, by providing a user with a budget of an energy usage charge for each period based on a past energy usage history, it is possible to support user's planned energy consumption. In addition, according to embodiments of the present invention, by visually displaying, on a user terminal, current energy usage information compared with a budget of an energy usage charge for each period, ranking information with a neighbor group with respect to energy saving information against past energy usage, and the like, it is possible to provide a user with a user experience (UX) to manage energy consumption.

BRIEF DESCRIPTION OF DRAWINGS

FIG. 3 is a flow diagram illustrating a detailed process of generating energy usage status information at steps S240 of FIG. 2A and S290 of FIG. 2B according to an embodiment of the present invention.

FIG. 4 is a diagram illustrating a method for simplifying electricity usage history information for predicting an electricity charge according to an embodiment of the present invention.

FIG. 5 is a flow diagram illustrating a detailed process of generating electricity charge budget information at step S300 of FIG. 3 according to an embodiment of the present invention.

FIGS. 11A, 11B, and 11C are diagrams illustrating screens for displaying ranking information based on a target charge of a terminal, ranking information based on an energy usage charge saving amount, and carbon emission information according to an embodiment of the present invention.

FIGS. 12A and 12B are diagrams illustrating a notification service based on a current energy usage charge against an energy usage charge budget of a terminal according to an embodiment of the present invention.

MODE FOR THE INVENTION

Figure 1:
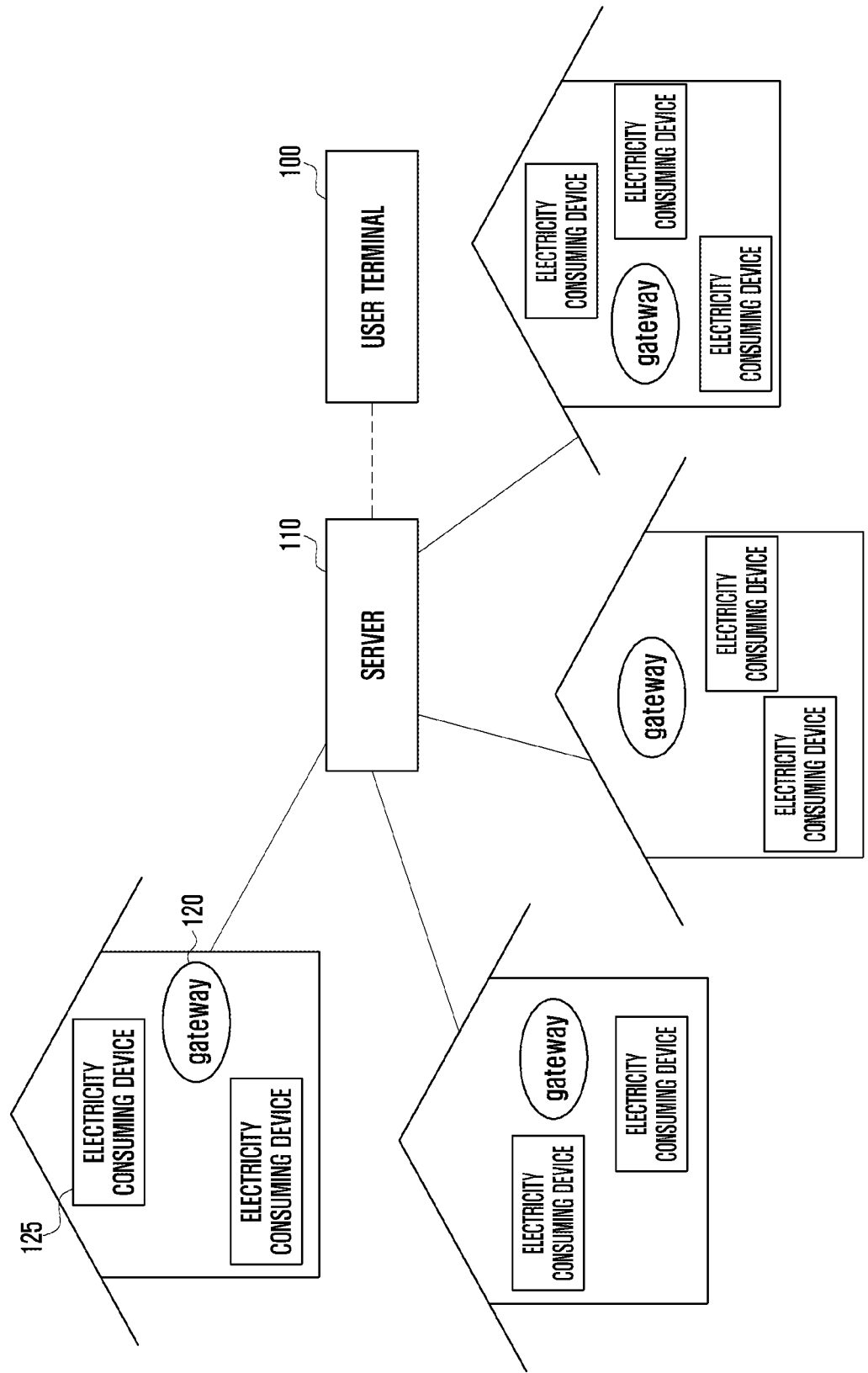
FIG. 1 is a diagram illustrating a system for managing energy consumption according to an embodiment of the present invention.

Hereinafter, embodiments of the present invention will be described with reference to the accompanying drawings.

In the following description of embodiments, descriptions of techniques that are well known in the art and not directly related to the present invention are omitted. This is to clearly convey the gist of the present invention by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to embodiments described in detail below with reference to the accompanying drawings. The present invention may, however, be embodied in many different forms and should not be construed as limited to embodiments set forth herein. Rather, these embodiments are provided so that this disclosure will be thorough and complete, and will fully convey the scope of the invention to those skilled in the art. To fully disclose the scope of the invention to those skilled in the art, and the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

For reference, the term "energy usage status information" in the present invention refers to information related to energy usage, charges, and the like at the present time that the user can use to manage energy consumption.

In the present invention, the term "target charge information" refers to information on an energy charge that the user inputs through a terminal based on desired consumption of a certain period.

In the present invention, the term "energy charge budget information" refers to information on energy charges distributed in each period to comply with the target charge information.

FIG. 1 is a diagram illustrating a system for managing energy consumption according to an embodiment of the present invention.

The system for managing energy consumption may include a user terminal 100, a server 110, a gateway 120 connected to the server 110 in one or more households, and one or more electricity consuming devices 120 in the household.

The user terminal 100 may include a mobile communication terminal used generally in the technical field of the present invention. The user terminal 100 may be connected to the server 110 to transmit and receive information necessary for managing energy consumption. Although not shown in FIG. 1, the user terminal 100 may be connected to the server 110 through a mobile communication network. That is, the server 110 may be a content provider server that provides information necessary for managing energy consumption, and the user terminal 100 may receive information, provided to the mobile communication network, through a base station.

According to an embodiment of the present invention, the user terminal 100 may generate "energy usage status information" necessary for managing energy consumption. The energy usage status information is information related to energy usage at the present time that the user can use to manage energy consumption. The energy may include at least one of electricity, water, and gas, but the following description will be limited to a case of electricity for simplicity of explanation. However, it is apparent to those skilled in the art that the present invention can be applied to energy, such as water, gas, etc. in addition to electricity, which incurs a burden of charges in a building. Specifically, the energy usage status information necessary for managing energy consumption may be generated by an application installed in the user terminal 100.

The energy usage status information may include at least one of energy charge budget information, energy charge information at the present time, saving charge information at the present time against charge information at a predetermined past time point, ranking information with a friend or similar group based on saving charge information, and carbon emission reduction information based on reduced usage information.

The user terminal 100 may receive, from a user, target charge information per period to manage energy consumption. The "target charge information" may be input from the user through a display, and corresponds to a target electricity charge that the user desires to consume for a certain period of time. The user terminal 100 may display a user interface (UI) for receiving the target charge information per period on the display. The period may include, for example, one month. Also, the user terminal 100 may check the energy usage status information and display it on the display.

The user terminal 100 may provide the user with a user experience (UX) of managing energy consumption by expressing the energy usage status information through the UI. That is, the present invention may deal with feelings, attitudes, behaviors, etc. of the user who manages energy consumption.

The server 110 may be connected to the gateway 120 in each household and receive energy consumption information of the energy consuming device 125. Alternatively, the server 110 may be connected to a server of an energy supplier and obtain information on energy consumption. The server 110 may accumulatively store such energy consumption information and generate energy consumption history information. The server 110 may provide the received energy consumption information to the user terminal 100. Also, the server 110 may generate the energy usage status information based on the received energy consumption information. That is, the energy usage status information may be selectively generated by an application in the user terminal 100 or in the server 110.

Additionally, the server 110 may store and manage the received energy consumption information in units of hour, day, and month. Also, using the received energy consumption information, the server 110 may provide a real-time prediction and management service in units of hour, day, and month. Further, the server 110 may receive energy usage information of households in a certain area as well as energy usage information of a household having the user of the user terminal 100, and then apply a game model through comparative monitoring for energy usage charges. The game model through the comparative monitoring may be based on, for example, a target charge, set by the user, or a saving charge against a past time point.

In addition, the server 110 may determine a household for the comparative monitoring to be compatible with the user of the user terminal 100. That is, rather than performing the comparative monitoring for households in a certain zone determined by a postal code, etc., the server may perform the comparative monitoring for households grouped in accordance with ages of household members, sizes of residences, applied rate systems, etc. in order to increase the association with the user. This grouping causes the comparison of realistic and meaningful energy charges and has the effect of motivating the user to manage energy consumption.

The gateway 120 may collect information on the energy consumption of the energy consuming devices existing in a house and transmit the collected information to the server 110. The gateway 120 may communicate with the energy consuming device 125 having a communication module built therein and collect information on energy consumption. On the other hand, the legacy energy consuming device 125 having no built-in communication module may measure information on energy consumption and transmit the measured information to the gateway 120 through a smart meter having a built-in communication module.

The energy consuming devices 125 may include all energy consuming devices existing in a house or a building. Assuming that the energy is electric electricity, the energy consuming devices may include a TV, a desktop computer, a refrigerator, a lamp, and the like. The energy consuming device 125 having the communication module embedded therein may transmit energy consumption information to the gateway 120. The legacy energy consuming device 125 having no built-in communication module may measure information on energy consumption, be connected to a smart meter having a built-in communication module, and then transmit the measured information to the gateway 120.

Figure 2A:
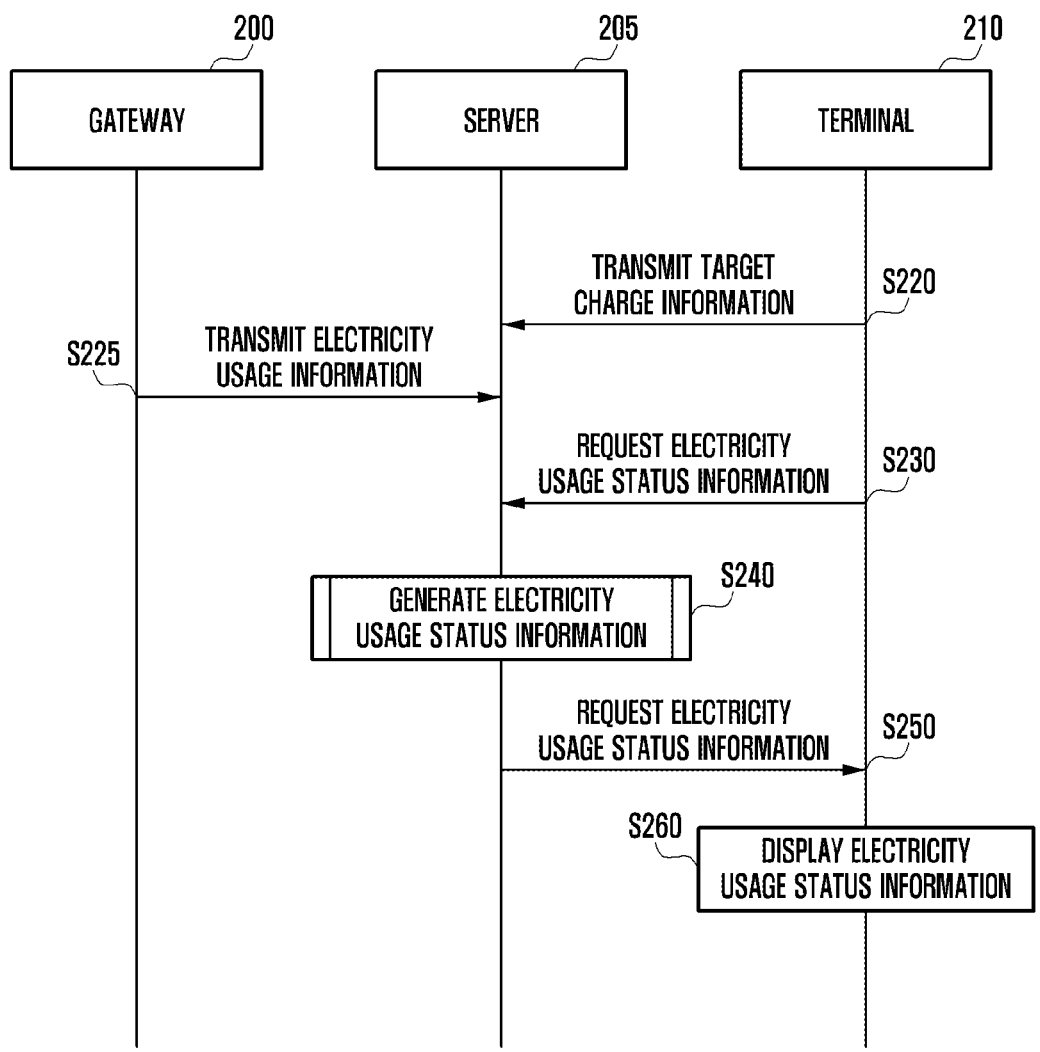
FIGS. 2A and 2B are diagrams illustrating a method for managing energy consumption according to an embodiment of the present invention.
Figure 2B:
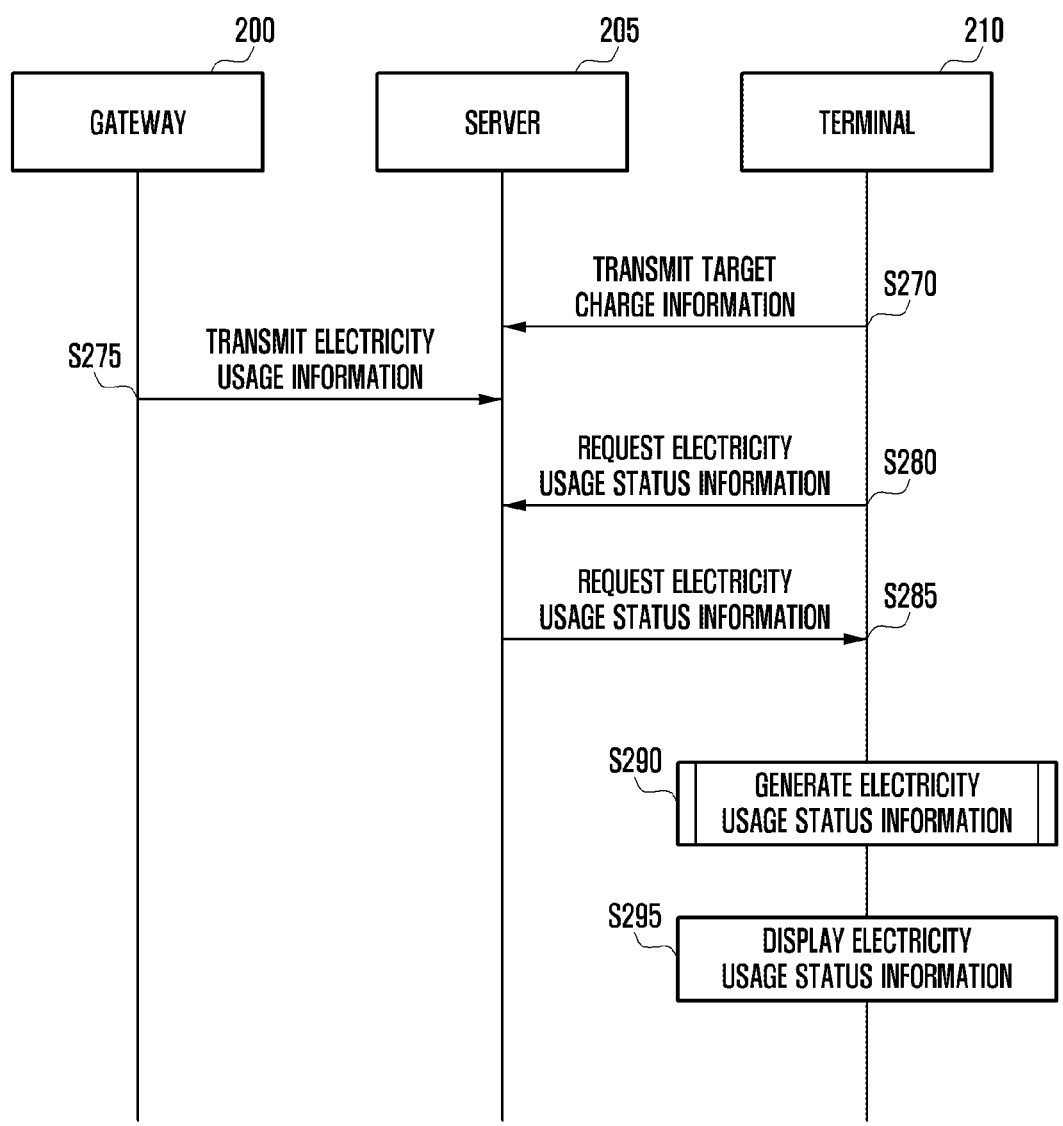

FIGS. 2A and 2B are diagrams illustrating a method for managing energy consumption according to an embodiment of the present invention.

Hereinafter, it is assumed that the energy is electricity. Specifically, FIGS. 2A and 2B are diagrams illustrating operations among a gateway 200, a server 205, and a terminal 210 to manage energy consumption. FIG. 2A shows one embodiment of the present invention in which the server 205 generates electricity usage status information used to manage electricity consumption, and FIG. 2B shows another embodiment of the present invention in which the terminal 210 generates electricity usage status information used to manage electricity consumption.

Referring to FIG. 2A, the terminal 210 may transmit target charge information to the server 205 at step S220. The target charge information may be input from a user through a display, and corresponds to a target electricity charge that the user desires to consume for a certain period of time. In addition, at step S225, the gateway 200 may transmit electricity usage information to the server 205. The gateway 200 may collect the electricity usage information from an electricity consuming device in a house or a building and transmit the collected information to the server 205. In addition, the gateway 200 connected to the server 205 may include one or more gateways 200 installed in a building existing in a specific area. Therefore, the electricity usage information may include electricity usage information of electricity consuming devices in the building existing in the specific area through one or more gateways 200. The electricity usage information may be received from a smart meter, instead of the gateway 200, in the house. The smart meter may include those used when implementing an advanced metering infrastructure (AMI).

Thereafter, when the server 205 receives a message for requesting electricity usage status information from the terminal 210 at step S230, the server 205 may generate the electricity usage status information at step S240. The electricity usage status information may include at least one of electricity charge budget information, electricity charge information at the present time, saving charge information at the present time against charge information at a predetermined past time point, ranking information with other user group based on saving charge information, and carbon emission reduction information based on reduced usage information. At step S250, the server 205 may transmit the generated electricity usage status information to the terminal 210.

Then, at step S260, the terminal 210 may display the received electricity usage status information on the display. Displaying the electricity usage status information on the display by the terminal will be described later in detail with reference to FIGS. 6 to 12.

Referring to FIG. 2B, the terminal 210 may transmit target charge information to the server 205 at step S270. The target charge information may be input from a user through a display, and corresponds to a target electricity charge that the user desires to consume for a certain period of time. In addition, at step S275, the gateway 200 may transmit electricity usage information to the server 205. The gateway 200 may collect the electricity usage information from an electricity consuming device in a house or a building and transmit the collected information to the server 205.

Thereafter, at step S280, the terminal 210 may transmit a message for requesting electricity usage status information to the server 205. Then, the server 205 that receives the message may transmit, to the terminal 210, the electricity usage information received from the gateway 200. Then, at step S290, the terminal 210 that receives the electricity usage information may generate electricity usage status information. The electricity usage status information is the same as that generated by the server 205 of FIG. 2A. Then, at step S295, the terminal 210 may display the electricity usage status information. Displaying the electricity usage status information on the display by the terminal will be described later in detail with reference to FIGS. 6 to 12.

FIG. 3 is a flow diagram illustrating a detailed process of generating electricity usage status information at steps S240 of FIG. 2A and S290 of FIG. 2B according to an embodiment of the present invention.

Specifically, FIG. 3 is a flow diagram illustrating operations of the server or terminal that generates the electricity usage status information. As described in FIGS. 2A and 2B, the electricity usage status information may be generated by the server or terminal.

At step S315, the server or terminal may calculate an electricity charge budget per period based on a user's target charge. The server or terminal may predict an electricity charge for each period based on electricity consumption history information of the electricity consuming device received from the gateway, and then calculate the electricity charge budget per period to meet the target charge entered by the user. Rather than deriving a linear electricity charge budget per period in accordance with the target charge entered by the user, the server or terminal may derive a suitable electricity charge budget per period by considering a user's electricity usage pattern or the like included in the electricity consumption history information. A detailed description thereof will be described later in FIGS. 4 and 5.

At step S320, the server or terminal may generate comparative information between a current electricity charge and the electricity charge budget per period. By comparing a current cumulative electricity charge with an electricity charge budget at the present time in the electricity charge budget information per period, the server or terminal may generate information on target achievement probability based on a comparison ratio. The target achievement probability may be indicated as a grade according to a predetermined ratio. The grade may include, for example, excellent, good, fair, need of saving, and the like.

In addition, at step S330, the server or terminal may generate a similar group from households within a certain area. The "similar group" refers to groups being similar to the user in consideration of the characteristics of each household. The characteristics considered when generating the similar group may include at least one of the age of members constituting a household, the size of a building, and a rate system being used. Based on information received from the gateway, the server or terminal may check information on the characteristics of each household. A more detailed description thereof will be described later with reference to FIG. 9.

Thereafter, at step S335, the server or terminal may generate user ranking information in the generated similar group or a neighbor group, based on a current saving charge against a target charge or a past electricity charge. The "neighbor group" refers to households within a certain distance from a building where the user is located. In addition, when there is a user input for a specific object for which the comparative monitoring is desired, the server or terminal may generate the user ranking information in consideration of this input. A group of specific objects for which the comparative monitoring is desired is defined as a "friend group". Also, at step S340, the server or terminal may generate carbon emission information based on saving usage information against an electricity charge at a certain time point in the past. The carbon emission information may be calculated by a predetermined equation, and is not described in detail as being not directly related to the present invention.

At step S350, the server or terminal generates electricity usage status information by integrating the above generated information. Specifically, the electricity usage status information may include at least one of electricity charge budget information, electricity charge information at the present time, saving charge information at the present time against charge information at a predetermined past time point, ranking information with other user group based on saving charge information, and carbon emission reduction information based on reduced usage information.

FIG. 4 is a diagram illustrating a method for simplifying electricity usage history information for predicting an electricity charge according to an embodiment of the present invention.

Specifically, this diagram shows that the server or terminal simplifies the electricity usage history information necessary for predicting the electricity charge to generate the electricity charge budget information at step S315 of FIG. 3.

The server may receive information on electricity usage per household from the gateway. Also, the server may collect the electricity usage information and generate electricity usage history information. The electricity usage history information may include electricity usage information of one household with respect to each day of the week, each week, and each hour. The electricity usage history information may be represented by a matrix ( ) in which the T-axis is a day of the week, the j-axis is a week, and the k-axis is an hour. For example, in case of electricity usage history information having electricity usage information for three weeks, a matrix 400 of 7 (days)*3 (weeks)*24 (hours) may be generated.

In case of using the first simplification method, the server may simplify the 7*3*24 matrix 400 into a 2*1*1 matrix 410. That is, information for three weeks is integrated according to weekday and weekend, and an average of information for 24 hours is calculated. In the end, simplified one-week electricity usage information according to weekday and weekend is obtained.

In case of using the second simplification method, the server 36 may simplify the 7*3*24 matrix 400 into a 2*1*24 matrix 420. That is, information for three weeks is integrated according to weekday, weekend, and hour. In the end, simplified one-week electricity usage information according to weekday, weekend, and hour is obtained. In case of using the third simplification method, the server may simplify the 7*3*24 matrix 400 into a 7*1*24 matrix 430. In this case, information for three weeks is integrated according to day of the week and hour, and simplified one-week electricity usage history information is obtained.

When integrating and simplifying information for three weeks as described above, a weight may be assigned to each week. The weight of electricity usage information for the last one week is (%), the weight of electricity usage information for one week before the last one week is (%), and the weight of electricity usage information for one week before the last two weeks is (%). The weights may be initially predetermined as a specific value and then changed respectively while the sum of the three weights maintains 100%.

The server or terminal may change the weights, based on a variation of electricity usage accumulated over time. That is, if variations of electricity usage for the last one week and for one week before the last week are large after one week has elapsed after the prediction of electricity usage, it may be seen that the recent electricity usage information has a greater influence. Therefore, a greater weight may be given to the recent electricity usage information. The above variation may be derived from the electricity usage for the last one week and for one week before the last week.

The simplifying method shown in FIG. 4 is only one embodiment of the present invention and not construed as a limitation. By simplifying user history information as described above, a calculation time may be shortened in predicting the electricity charge. Further, the accuracy of the prediction may be maintained by differentially simplifying the electricity usage history information according to a variation of a rate system as described in FIG. 5.

FIG. 5 is a flow diagram illustrating a detailed process of generating electricity charge budget information at step S315 of FIG. 3 according to an embodiment of the present invention.

At step S500, the server or terminal may receive electricity usage information for a certain period. In this case, the server may receive electricity consumption information from a gateway installed in each household. In addition, the server may receive electricity usage information from a smart meter installed in each household. The server that receives the electricity usage information may transmit the received electricity usage information to the terminal.

Thereafter, at step S510, the server or terminal determines whether the user uses a variable rate system. This is to select a method for simplifying the electricity usage history information described in FIG. 4 depending on whether the variable rate system is used. The variable rate system refers to charges varying according to time zone and may include, for example, a time of use (TOU) system. The TOU system differentially sets the charge in a form of two-part system (i.e., on-peak and off-peak) or three-part system by considering a significant difference in electricity consumption depending on season and time.

If it is determined at step S510 that the user does not use the variable rate system, the server or terminal selects the second simplification method at step S520. That is, the server or terminal may simplify, for example, the 7*3*24 matrix 400 to the 2*1*24 matrix 420 as described above with respect to the received electricity usage information for three weeks. That is, information for three weeks is integrated according to weekday, weekend, and hour, and then the simplified one-week electricity usage information according to weekday, weekend, and hour is obtained. When the user uses the variable rate system, the server or terminal selects the third simplification method at step S530. That is, the server may simplify, for example, the electricity usage history information of 7 (days of week)*3 (weeks)*24 (hours) to the 7*1*24 matrix 430 with respect to the received electricity usage information for three weeks. In this case, information for three weeks is integrated according to days and hours, and then the simplified one-week electricity usage history information is obtained. When integrating the three-week information, the above-described weight for each week may be considered.

Thereafter, at step S540, the server or terminal may predict electricity usage information in units of hour, date, day of week, and month after the present time by using the simplified electricity usage history information.

Thereafter, at step S550, the server or terminal may convert the predicted electricity usage information into an electricity charge and thereby predict an electricity charge in units of hour, date, day of week, and month. Based on this information on the electricity charge per period, a pattern of the electricity charge may be predicted.

When the predicted electricity usage information is converted into the electricity charge, the server or terminal may consider the rate of change in charges with respect to the temperature change and thus further consider information about surrounding environment. The server or terminal may receive temperature information at a time point to be predicted from an external server such as a weather station server.

Thereafter, at step S560, the server or terminal may generate electricity charge budget information by converting the predicted electricity charge into a budget based on a target charge received from the user. For example, if the user inputs a one-month target charge, the predicted one-month electricity charge may be adjusted based on the target charge. Let's suppose that the total one-month electricity charge according to the one-month electricity charge pattern predicted by the server or terminal at step S550 exceeds a one-month target charge inputted by the user. In this case, the electricity charge budget information per period may be generated by reducing the total electricity charge for one month to the target charge and also reducing the electricity charge per hour, date, day of week, and month determined according to the predicted one-month electricity charge pattern at the same rate.

Likewise, if the monthly electricity charge according to the predicted one-month electricity charge pattern is less than the target charge, the electricity charge budget information per period may be generated by increasing the total electricity charge for one month to the target charge and also increasing the electricity charge per hour, date, day of week, and month determined according to the predicted one-month electricity charge pattern at the same rate.

As described above, by calculating the electricity charge budget for each period using the electricity usage history information, rather than deriving the electricity charge budget linearly according to hour or date, it is possible to form a budget to further comply with a user's electricity usage pattern and thereby efficiently manage energy consumption.

The above-described operation in FIG. 5 is one embodiment for generating the electricity charge budget information and not construed as a limitation of the present invention. In addition, as apparent to those skilled in the art, the above-described method for generating the electricity charge budget information may also be applied to a method for generating charge budget information of other energy types such as water or gas.

Figure 6:
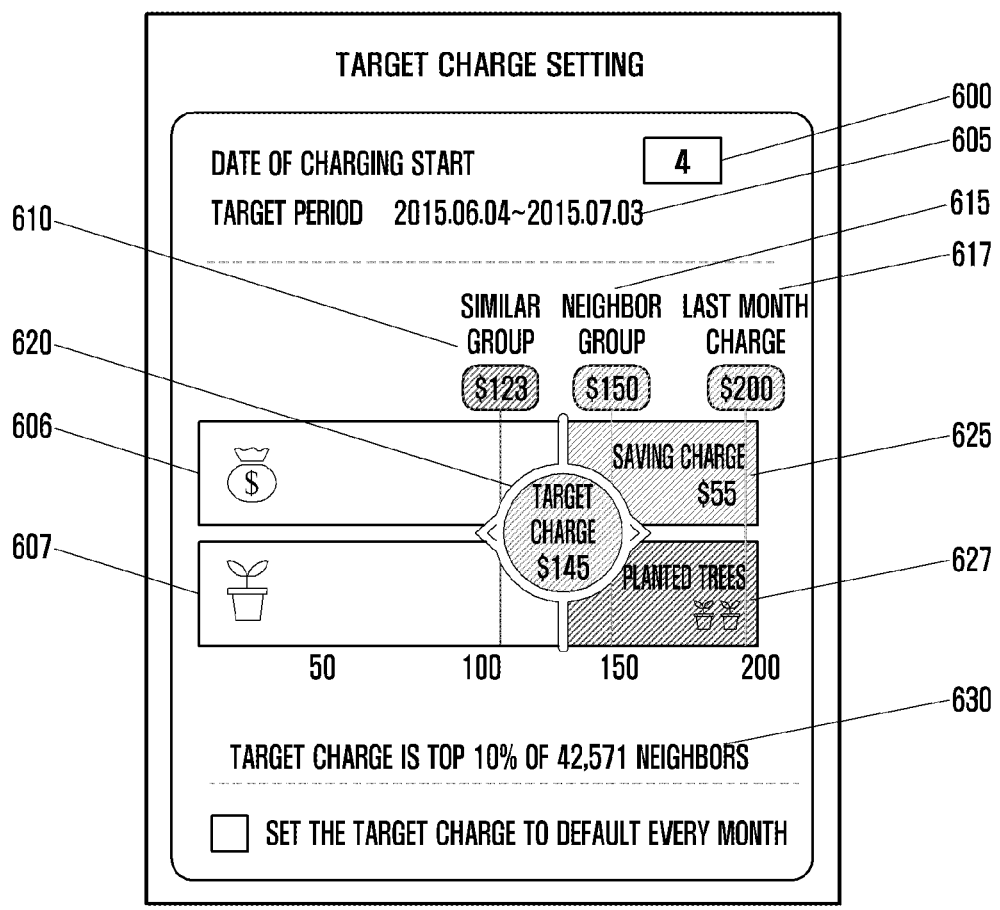
FIG. 6 is a diagram illustrating a target charge setting screen of a terminal according to an embodiment of the present invention.

FIG. 6 is a diagram illustrating a target charge setting screen of a terminal according to an embodiment of the present invention.

Specifically, FIG. 6 shows a screen in which a terminal receives a target charge from a user in order to transmit target charge information to a server. The terminal may display information that helps the user to set the target charge. The following example shows that the user enters the target charge for a month.

The terminal may display a rate start date 600 from which a charge is to be measured, and also display a target period 605 for which a target charge is to be applied. In addition, the terminal may display, in the middle of the screen, a bar-shaped item 606 for indicating a charge and another bar-shaped item 607 for indicating the amount of carbon emission. In addition, the terminal may display an item 610 for indicating the last month usage charge of a similar group, an item 615 for indicating the last month usage charge of a neighbor group, and an item 617 for indicating the last month usage charge of the user. These items 610, 615, and 617 may be in the form of a line perpendicular to the item 606 for indicating the charge. The items 610, 615, and 617 may be overlapped with the item 606 for the charge at positions determined based on information represented by the items. When usage charges of a similar group and a neighbor group and the user's last month usage charge are provided, the user may refer to this when setting the target charge.

The terminal may display an item 630 for receiving the target charge from the user. The item 630 for receiving the target charge may be displayed to be overlapped with both the bar-shaped item 606 for indicating the charge and the bar-shaped item 607 for indicating the carbon emission amount. In addition, the item 630 for receiving the target charge may have a circular form with arrows on both sides, so that the user can input the target charge by moving the item 630 from side to side. When the terminal detects a left or right movement of the item 607 for receiving the target charge, the terminal may determine, based on a moving distance, the target charge information inputted by the user. Also, since the target charge is changed in position according to an input, the user may compare, based on a relative position, the target charge with the item 610 for indicating the last month usage charge of the similar group, the item 615 for indicating the last month usage charge of the neighbor group, or the item 617 for indicating the last month usage charge of the user. That is, based on such a relative distance between the item 607 for receiving the target charge and the item 610, 615, or 617, the terminal may determine the user's target charge information.

In addition, although not shown in the drawing, the user not only inputs the target charge by moving the item 607 for receiving the target charge from side to side, but also may directly input the target charge by using a keypad which is displayed when the item 607 is touched.

Depending on the relative position of the item 620 for receiving the target charge, the bar-shaped item 606 for indicating the charge and the bar-shaped item 607 for indicating the carbon emission amount may change a colored region thereof. In addition, the item 606 for indicating the charge may show a saving charge 625 against the previous month in view of the target charge. In addition, the item 607 for indicating the carbon emission amount may show a reduction amount of carbon emission against the previous month in view of the target charge inputted by the user. The carbon emission reduction amount may be displayed together with information on the number of planted trees having the same effect according to a given calculation rule. In addition, the terminal may display the user's target charge as an upper percentage (%) 630 compared to neighbors. When the terminal receives the target charge through the item 630 for receiving the target charge from the user, the terminal may transmit the target charge information to the server.

Figure 7:
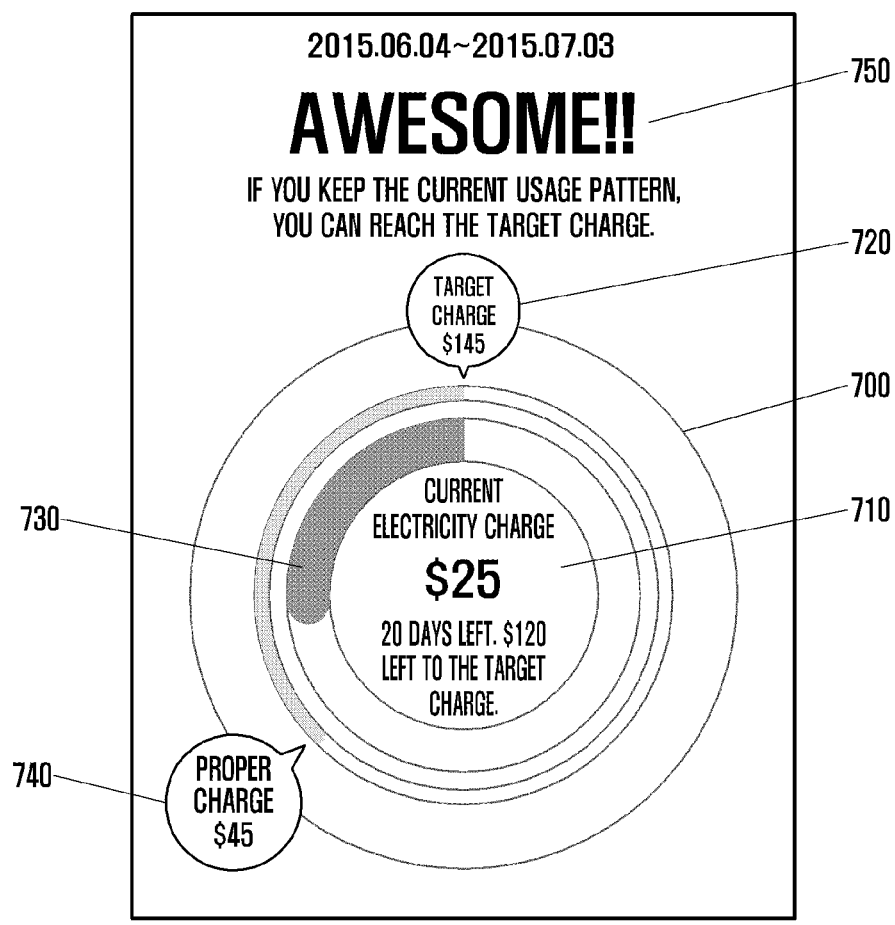
FIG. 7 is a diagram illustrating a screen for displaying current energy usage charge information with respect to a current energy usage charge budget based on a target charge of a terminal according to an embodiment of the present invention.

FIG. 7 is a diagram illustrating a screen for displaying current energy usage charge information with respect to a current energy usage charge budget based on a target charge of a terminal according to an embodiment of the present invention.

Specifically, FIG. 7 shows that the terminal displays electricity charge budget information per period in the electricity usage status information generated by the terminal or received from the server, and current electricity charge information compared to the budget information.

The terminal may display a circular item 700 in the center of the screen to compare the electricity charge budget information with the current electricity charge information. At the center of the circular item, current electricity charge information 710 may be displayed. Together with the current electricity charge information, information about the remaining days until charge settlement and information about the remaining budget corresponding to a difference between the target charge and the current electricity charge may be displayed. In addition, an indicator 720 for indicating the target charge information may be displayed in the twelve o'clock direction of the circular item 700. The indicator 720 may be a reference point for displaying the current electricity charge in the circular item 700.

The terminal may display the current electricity charge in the form of an arc 730 in the circular item 700. The length of the arc 730 may be determined depending on the ratio of the current electricity charge to the target charge. The length of the arc 730 may be calculated by multiplying the length of the circumference of the circular item 700 by the ratio of the current electricity charge to the target charge. In addition, the terminal may display a guide indicator 740 for indicating the current electricity charge budget information at the edge of the circular item 700. Using the electricity charge budget information per period generated by the server or terminal, the current electricity charge budget information may be derived. Then, the guide indicator may be displayed at a position away from the target charge indicator 720 by an angle derived by multiplying the ratio of the current electricity charge budget to the total target charge by 360 degrees.

Also, the terminal may display a grade 750 depending on target achievement probability at the top of the screen. That is, the grade may be obtained by dividing the ratio of the current electricity charge to the current electricity charge budget by a given period. The grade may include, for example, excellent, good, fair, need of saving, and the like. As another example, the grade may include awesome, great, good, bad, and the like.

Figure 8A:
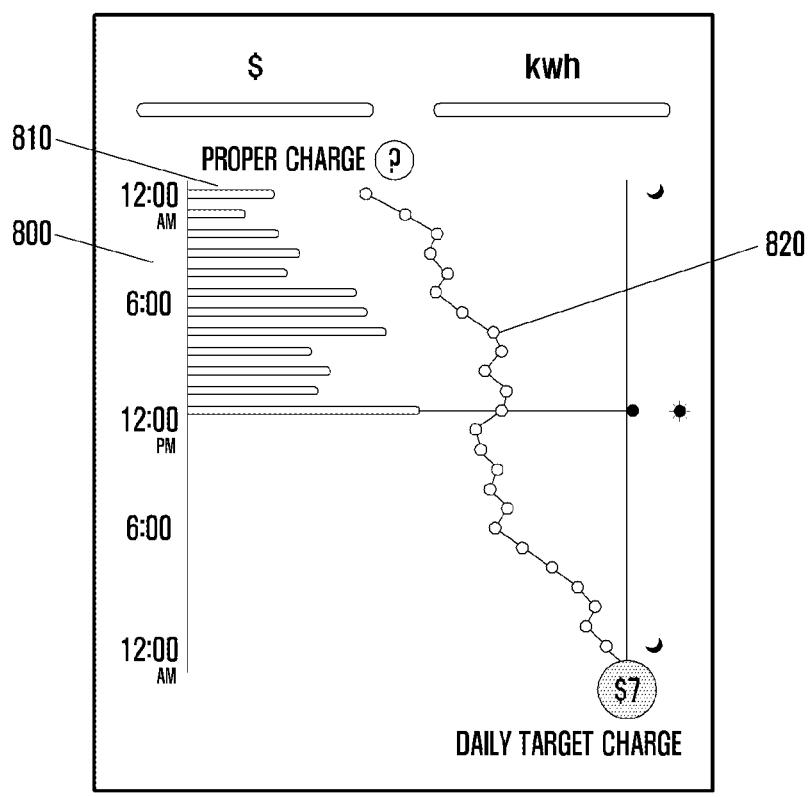
FIGS. 8A, 8B, and 8C are diagrams illustrating screens for displaying information managing hourly, daily, and monthly energy consumption at a terminal according to an embodiment of the present invention.
Figure 8B:
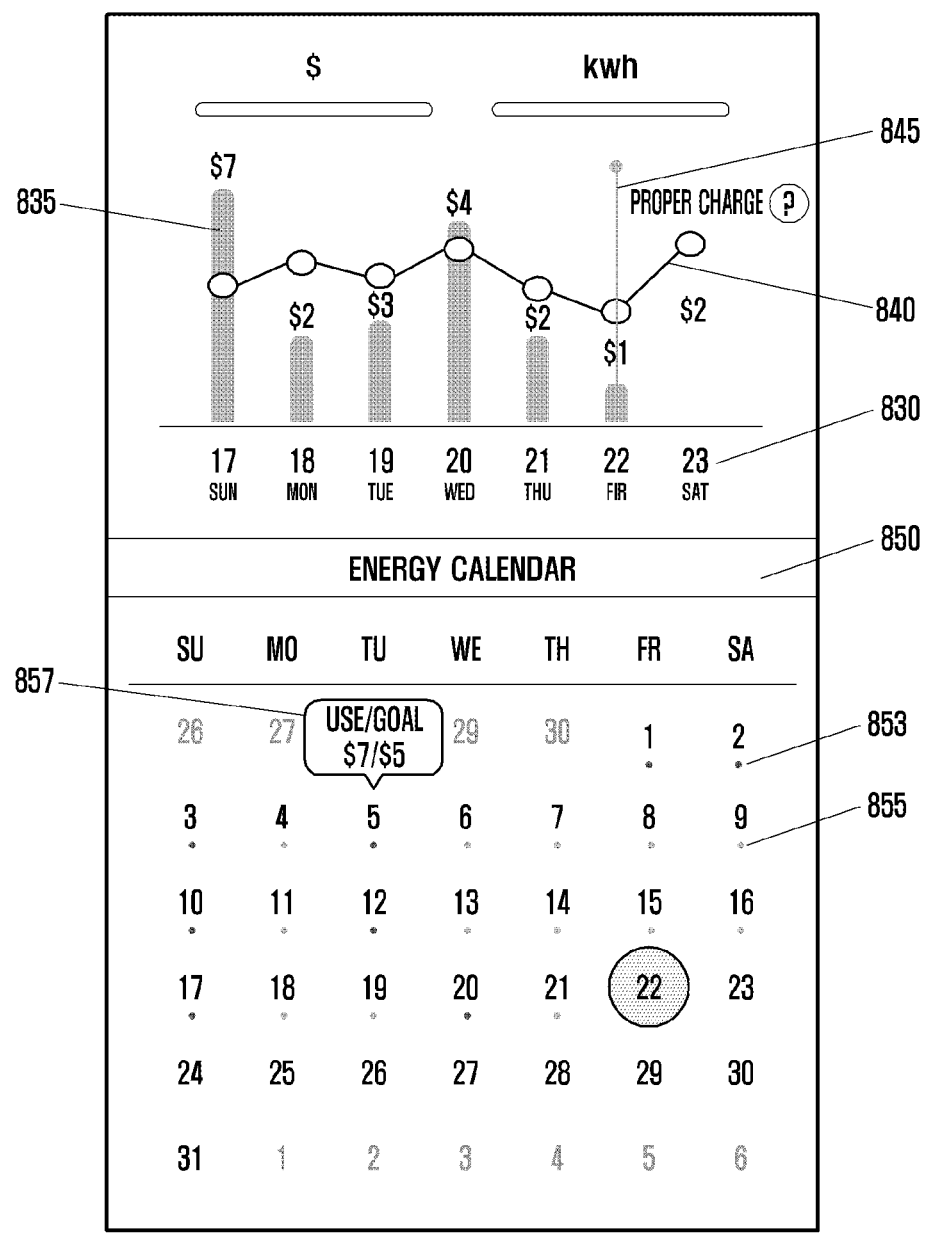
Figure 8C:
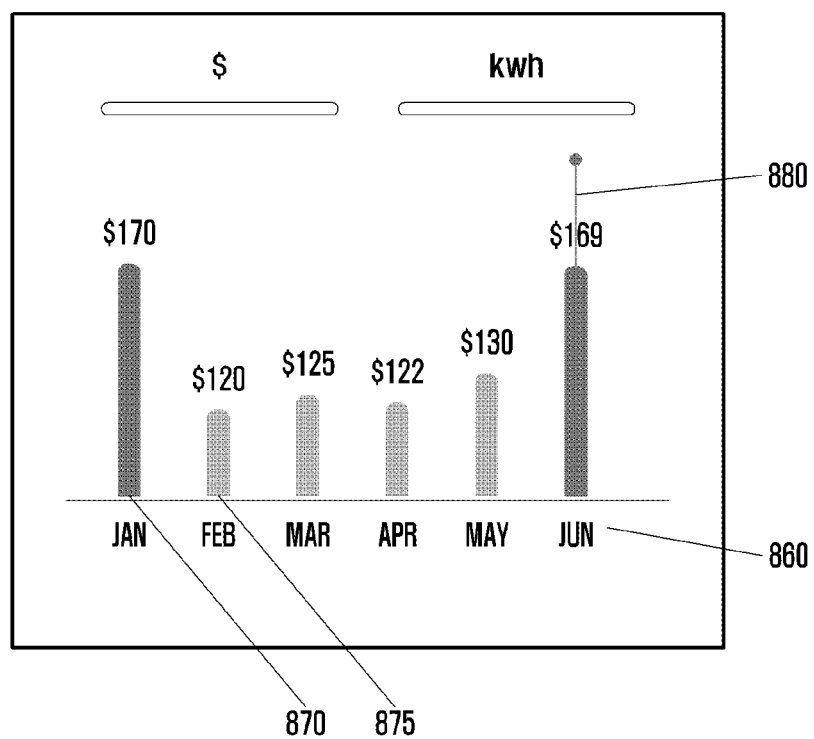

FIGS. 8A, 8B, and 8C are diagrams illustrating a screen for displaying information for managing energy consumption of a terminal in units of hour, day, and month according to an embodiment of the present invention.

Specifically, the terminal displays electricity charge budget information per period in the electricity usage status information generated by the terminal or received from the server, and current electricity charge information compared to the budget information.

First, FIG. 8A is a diagram illustrating that the terminal displays a screen for managing hourly electricity consumption for one day. The user may select information based on electricity charge and electricity consumption. As shown in FIG. 8A, a vertical axis 800 represents hours, and the hourly electricity usage charge may be indicated by a bar graph 810. Also, the hourly electricity charge budget information according to the vertical axis 800 may be indicated by a line graph 820. By indicating the hourly electricity charge budget information together, the user may be provided with a guideline for the optimal usage at the present time. In addition, when the numerical value of the bar graph 810 exceeds the numerical value of the line graph 820, the terminal may provide a notification to the user in the form of a pop-up window, sound, or the like. In addition, when the estimated charge is expected to exceed the target charge in the near time even if the current charge does not exceed the target charge, the terminal may perform an alert notification based on the rate of change in electricity charges for a certain time.

FIG. 8B is a diagram illustrating that the terminal displays a screen for managing daily electricity consumption for a month. The terminal may display a graph having a horizontal axis 830 as the date on an upper portion of the screen. In addition, the terminal may display the electricity usage charge information of the corresponding date with a bar graph 835, and display the electricity usage charge budget information of the corresponding date with a line graph 840. Also, in case of the current date on which the user confirms the screen, the terminal may display the electricity usage charge information up to the present time, e.g., the electricity usage charge of the current date 845 predicted when a current electricity usage pattern is maintained. On a lower portion of the screen, a calendar 850 may be displayed to allow the user to check whether the daily budget for a month is satisfied. The terminal may display different indicators 853 and 855 at the bottom of each date, based on whether the daily budget is satisfied. Further, when the user touches a specific date of the calendar 850, the terminal may display electricity charge and budget information 857 of the corresponding date.

FIG. 8C is a diagram illustrating that the terminal displays a screen for managing monthly electricity consumption. The terminal may display a graph in which a horizontal axis 860 indicates months. In addition, the terminal may display the monthly electricity charge information by using a bar graph with different colors 870 and 875 depending on whether the monthly target charge is satisfied. In addition, in case of the current date on which the user confirms the screen, the terminal may display the electricity usage charge information up to the present time, e.g., the electricity usage charge of the current date 880 predicted when a current electricity usage pattern is maintained.

Figure 9:
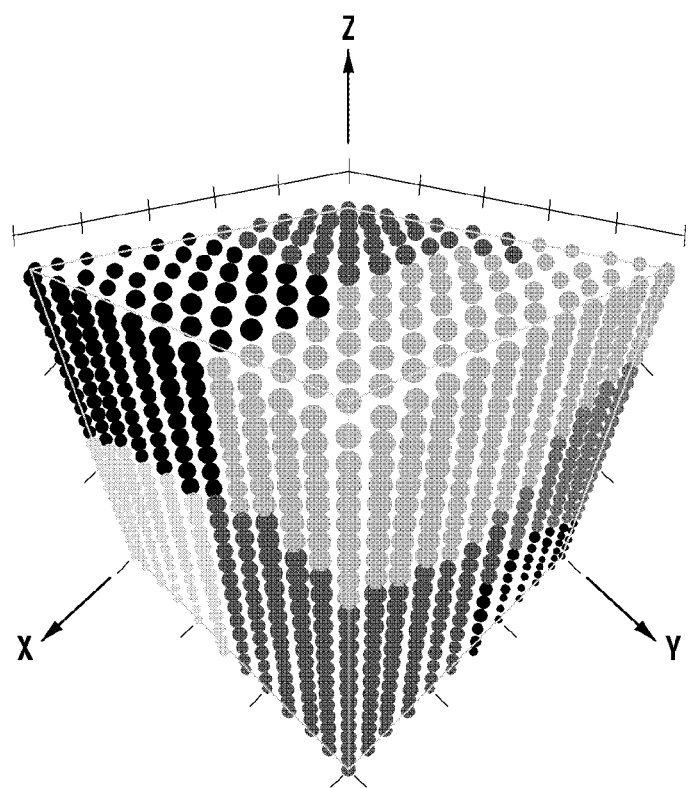
FIG. 9 is a diagram illustrating a method for generating a similar group according to an embodiment of the present invention.

FIG. 9 is a diagram illustrating a method for generating a similar group according to an embodiment of the present invention.

Specifically, in order to provide the user with electricity charge comparative information with other households, the server or terminal may generate a group from households adjacent to the user.

The group generated by the server or terminal may include a neighbor group and a similar group. The neighbor group refers to a group generated by extracting households within a predetermined radius from a place where the user is located. The server or terminal may generate the neighbor group by using the location information of the terminal.

Further, the similar group refers to a group generated by extracting households similar to a household to which the user belongs, in consideration of the characteristics of each household. The characteristics used for determining the similar group may include a zip code, the number of residents divided by age, the size of residence, and an applied rate system. The server may receive the characteristic information of the household from the gateway installed in each household. The terminal may receive the characteristic information of household from the server.

As shown in FIG. 9, the server or terminal may generate, from households to which other users belong, a graph based on the characteristics for generating the similar group. For example, households may be represented based on residents equal to or older than 18 years (x), residents younger than 18 years (y), and sizes of residence (z). In addition, the graph may be differentially colored with zip codes or rate systems. Thereafter, a location 900 indicating the characteristics of the user is displayed on the graph, and then adjacent households shown in the graph may be extracted to generate a similar group.

As described above, a group for comparison of electricity charges is selected by extracting households being similar in characteristics to the user, rather than using only zip codes. Therefore, there is an effect that the user can make realistic comparison possible.

Figure 10:
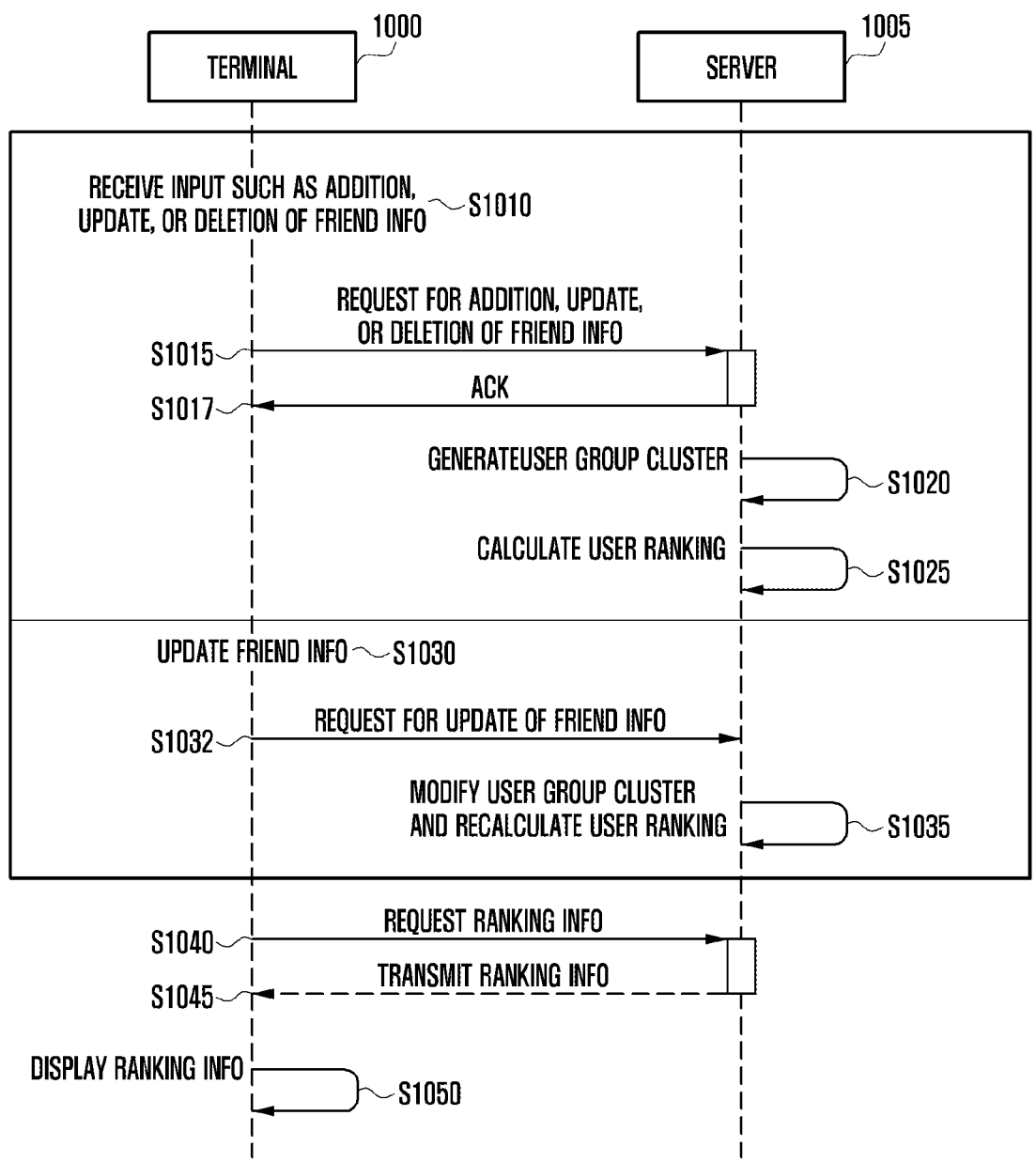
FIG. 10 is a diagram illustrating a method for calculating the ranking by comparing a saving charge with other users according to an embodiment of the present invention.

FIG. 10 is a diagram illustrating a method for calculating the ranking by comparing a saving charge with other users according to an embodiment of the present invention.

Specifically, FIG. 10 illustrates an embodiment in which the server generates ranking information in the electricity usage status information. As apparent to those skilled in the art, the embodiment described in FIG. 10 may be applied to another embodiment in which the terminal generates the ranking information.

In addition to generating a similar group as shown in FIG. 9, the server or terminal may generate a "friend group" by receiving information on a specific comparative object from the user. This specific object to be compared is defined as "friend" in the present invention. When receiving a user input for requesting the addition, update, or deletion of friend information at step S1010, the terminal may transmit a message for requesting the addition, update, or deletion of friend information to the server 1005 at step S1015. The server 1005 transmits an acknowledgement message indicating the reception of the request message to the terminal 1000 at step S1017, and then generates a user group cluster on the basis of the request message at step S1020. The generated user group cluster is a friend group.

Thereafter, at step S1025, the server calculates the user ranking in the generated user group cluster. Then, if the terminal updates the friend information at step S1030 and transmits this to the server 1005, the server may modify the user group cluster and recalculate the user ranking for the electricity saving charge at step S1035. Thereafter, the terminal 1000 may transmit a message for requesting ranking contention information at step S1040. In response to this, the server 1005 may transmit a ranking contention response message including the calculated ranking information to the terminal 1000 at step S1045. At step 1050, the terminal 1000 may display the received ranking contention information on the display.

Parts (a), (b), and (c) of FIG. 11 are diagrams illustrating screens for displaying ranking information based on a target charge of a terminal, ranking information based on an energy usage charge saving amount, and carbon emission information.

Part (a) of FIG. 11 is a diagram showing a screen on which the terminal displays the ranking information based on the target charge. The terminal may display, on the screen, the ranking information received from the server or generated by the terminal. First, ranking information 1100 in the total neighbor group may be displayed. Then, ranking information 1103 in the similar group and ranking information 1106 in the friend group may be displayed. By providing the ranking information in the similar group having similar characteristics to the user and the ranking information in the friend group set by the user as well as the ranking information in the neighbor group based on a distance from the user's household with respect to the target charge, there is an effect of widening the user experience of managing energy consumption.

Part (b) of FIG. 11 is a diagram showing a screen on which the terminal displays the ranking information based on the saving charge. The terminal may display, on the screen, the ranking information based on the saving charge against the electricity charge of the last month generated by the terminal or received from the server. In this case, the ranking information 1110 in the neighbor groups, the similar group, and the friend group may be displayed as in part (a) of FIG. 11. In addition, since friend information can be received through a social network service (SNS) with respect to the friend group, information 1115 on friends of the ranking in the friend group may be displayed. In this case, a friend's profile photograph may be displayed using a circular item. Also, saving usage and saving charge may be displayed at the bottom of the friend information. Also, the user may share the information displayed in part (b) of FIG. 11 with other users by using a UI object 1117 displayed on the screen.

Part (c) of FIG. 11 is a diagram showing a screen on which the terminal displays information on a carbon emission amount. The terminal may display carbon emission amount information 1120 based on the saving charge received from the server or generated by the terminal. In addition, the terminal may display information 1125 on the number of planted trees having the same effect, based on the saving carbon emission amount according to a given calculation rule.

As described above, by providing the user with meaningful comparative data, such as ranking information in a similar group or a friend group, with respect to electricity charges, this invention may ensure consensus among users and stimulate competition for saving of energy consumption. In addition, by providing simple numerical information such as carbon emissions and also providing information on the number of planted trees having the same effect, the user may be provided with various degrees of satisfaction. In addition, the terminal may allow the user to feel a rich user experience (UX) in managing the electricity consumption.

Figure 12A:
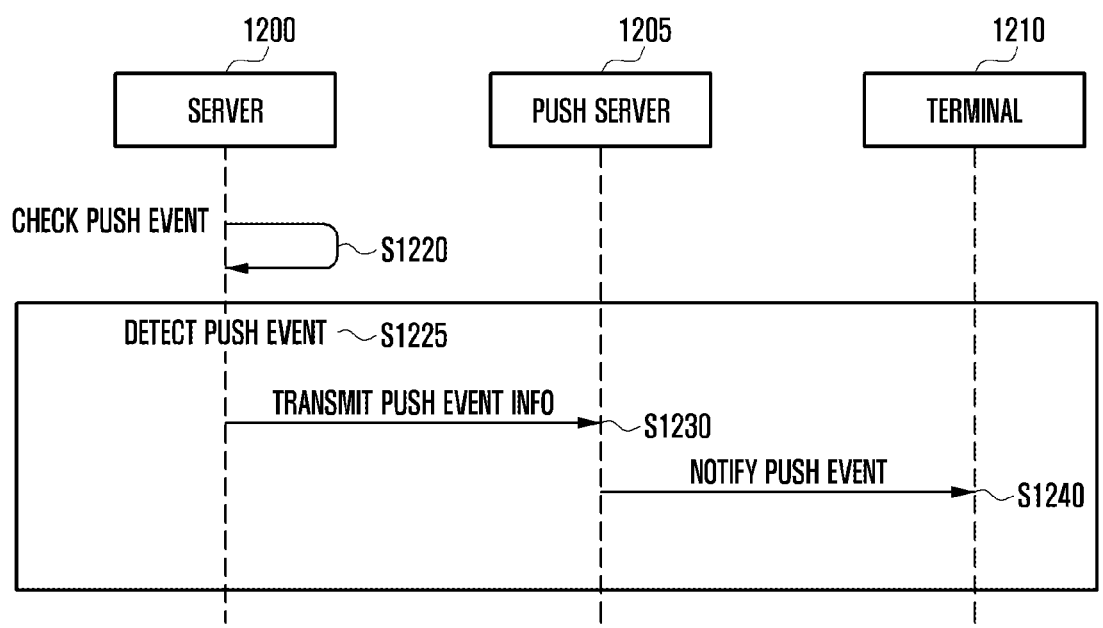

FIGS. 12A and 12B are diagrams illustrating a notification service based on a current energy usage charge compared to an energy usage charge budget of a terminal according to an embodiment of the present invention.

Specifically, FIG. 12A illustrates a process of transmitting and receiving information of each node to provide a notification service, and FIG. 12B illustrates a terminal screen displaying a notification.

In FIG. 12A, the server 1200 checks at step S1220 whether there is a push event to provide a notification service. The push event may be based on electricity charge budget information or ranking information. For example, the push event may include a case where a user's current electricity charge exceeds an electricity charge budget at the present time. In addition, when a recent electricity usage pattern is increased to a certain rate or more even if the current electricity charge does not exceed the budget, there is a possibility of exceeding the electricity charge budget, and the push event may include this case. In addition, the push event may include a case where the ranking of user's saving charge is changed within a similar group or a friend group. In addition, the push event may include a case where the ranking of saving charge of a friend preset by the user is changed.

Thereafter, when the occurrence of a push event is detected at step S1225, the server 1200 may transmit information on the push event to a push server 1205. Then, the push server 1205 may notify the occurrence of the push event to the terminal 1210. The terminal 1210 that receives a notification message may display the push event as a push message.

FIG. 12B illustrates that the terminal 1210 receiving the notification message displays the push event as a push message. Reference numeral 1250 indicates a push message that alerts the user to the excess of electricity charge budget of the current date if the user uses electricity charges according to a current pattern. In addition, reference numeral 1260 indicates, as a push message, information on the ranking change, a saving charge, and a saving usage amount when the user's ranking is changed. Although FIG. 12B illustrates an embodiment for notifying a push event with a push message, this is only an embodiment of the present invention. Alternatively, a push event may be notified to the user through a short message service (SMS) rather than a push message.

Figure 13:
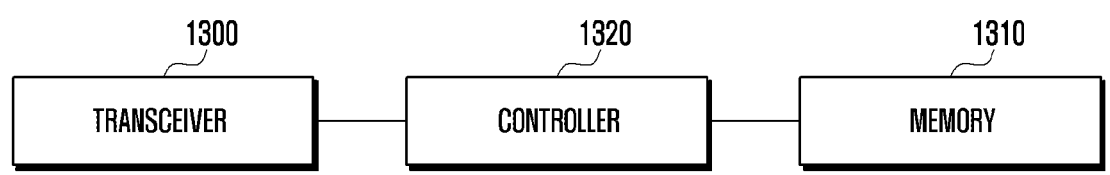
FIG. 13 is a block diagram illustrating an internal structure of a server according to an embodiment of the present invention.

FIG. 13 is a block diagram illustrating an internal structure of a server according to an embodiment of the present invention.

Specifically, the server may include a transceiver 1300, a storage 1310, and a controller 1320.

The transceiver 1300 may transmit and receive information necessary for the server to perform operations according to the present invention. The communication unit 1300 may receive target charge information from a terminal. The transceiver 1300 may receive electricity usage information from a gateway. The transceiver 1300 may transmit electricity usage status information, generated by the controller 1320, to the terminal. The electricity usage status information may include at least one of electricity charge budget information, electricity charge information at the present time, saving charge information at the present time against charge information at a predetermined past time point, ranking information with other user group based on saving charge information, and carbon emission reduction information based on reduced usage information. The storage 1310 may store information necessary for the server to perform operations according to the present invention. The storage 1310 may store information received from the transceiver 1300 and provide this information to the controller 1320. Specifically, the storage 1310 may store target charge information received from the terminal and electricity usage information received from the gateway, and provide them to the controller 1320 when the electricity usage status information is generated.

The controller 1320 may control receiving user's target charge information for a specific period from the terminal, generating electricity charge budget information for the specific period, based on the target charge information and user's electricity usage history information received from the gateway, and transmitting the generated electricity charge budget information to the terminal.

In addition, the controller 1320 may control predicting the electricity charge pattern for the specific period, based on the user's electricity usage history information, adjusting the predicted electricity charge pattern, based on the target charge information, and determining the adjusted electricity charge pattern as the electricity charge budget information. The electricity charge budget information may include electricity charge budget information by time and date for achieving the target charge for the specific period.

Further, the controller 1320 may control simplifying the electricity usage history information received from the gateway, based on whether the user uses a variable rate system, and predicting the electricity charge pattern, based on the simplified electricity usage history information. Also, the controller 1320 may control calculating the ratio of the target charge to the total electricity charge for a specific period according to the predicted electricity charge pattern, and generating the electricity charge budget information for the specific period by reflecting the calculated ratio on the predicted electricity charge pattern.

The controller 1320 may control receiving information on the characteristics of each household from at least one gateway, generating a similar group by extracting households being similar in characteristics to the user's household, based on the characteristics of each household, generating ranking information based on a user's saving charge against a certain previous period in the group, and transmitting the ranking information to the terminal. Also, the controller 1320 may control generating information on the carbon emission amount based on a user's reduced electricity usage against a certain previous period, and transmitting the generated carbon emission amount information to the terminal.

Figure 14:
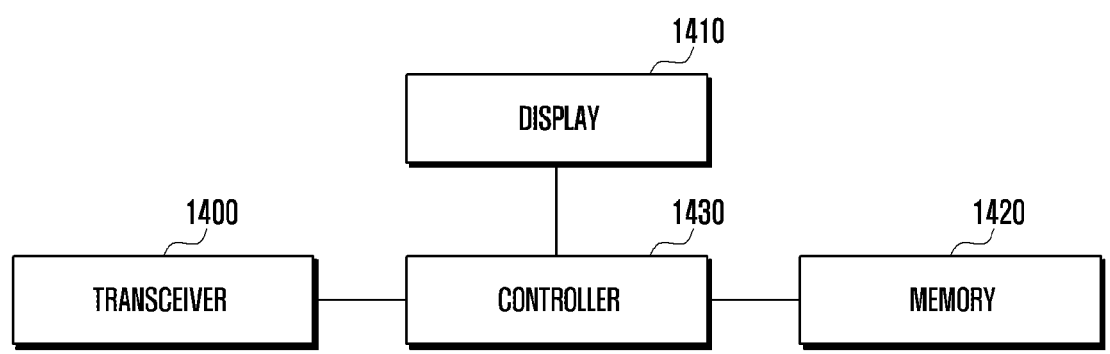
FIG. 14 is a block diagram illustrating an internal structure of a terminal according to an embodiment of the present invention.

FIG. 14 is a block diagram illustrating an internal structure of a terminal according to an embodiment of the present invention.

Specifically, the terminal may include a transceiver 1400, a display 1410, a storage 1420, and a controller 1430.

The transceiver 1400 may transmit and receive information necessary for the terminal to perform operations according to the present invention. Specifically, the transceiver 1400 may transmit target charge information, received from the user, to a server. In addition, the transceiver 1400 may transmit a request message for electricity usage status information to the server. Also, the transceiver 1400 may receive the electricity usage status information from the server. Further, the transceiver 1400 may receive electricity usage information from the server by request.

The display 1410 may display information necessary for the terminal to perform operations according to the present invention. Also, the display 1410 may include a touch screen capable of receiving a user input. Specifically, the display 1410 may display electricity usage status information received from the server or generated by the controller 1430. Specifically, the display 1410 may display electricity charge budget information included in the electricity usage status information and user's current electricity charge information. In addition, the display 1410 may display ranking information in a certain group included in the electricity usage status information. Also, the display 1410 may display carbon emission amount information included in the electricity usage status information.

Further, the display 1410 may display a first item corresponding to target charge information for a specific period inputted from the user, a second item corresponding to electricity charge budget information at a specific time point, and a third item corresponding to user's electricity charge information at the specific time point. In this case, the second item may be displayed on the basis of the ratio of the electricity charge budget information at the specific time point to the target charge information, based on a position of the first item. Also, the third item may be displayed on the basis of the ratio of the user's electricity charge information at the specific time point to the electricity charge budget information at the specific time point, based on the second item.

Further, the display 1410 may display the first and second items to indicate a fourth item, and display the third item to occupy a portion of the fourth item. In addition, the fourth item may be displayed as a circular item, and the third item may be displayed as an arc-shaped bar occupying a portion of the circular item. Also, the display 1410 may display the third item with a color determined depending on the ratio of the user's electricity charge information at the specific time point to the electricity charge budget information at the specific time point.

Further, the display 1410 may display a sixth item indicating saving charge information compared to a past time point, based on the user's target charge information, and a seventh item corresponding to at least one other user's target charge information. The sixth item may be displayed to overlap with a portion of the fifth item, and the seventh item may be displayed to overlap with a portion of the sixth item. Also, the sixth item may be displayed in the form of bar.

Additionally, the storage 1420 may display information necessary for the terminal to perform operations according to the present invention. Specifically, the storage 1430 may store information received from the transceiver 1400 and provide it to the controller 1430. The storage 1420 may store target charge information received from the user. Also, the storage 1420 may receive and store the electricity usage status information and transmit it to the controller 1430. Further, the storage 1420 may store the electricity usage information and transmit it to the controller 1430.

The controller 1430 may control transmitting user's target charge information for a specific period to the server, identifying the electricity charge budget information for the specific period, based on the target charge information and user's electricity usage history information, and displaying the generated electricity charge budget information on the display.

In addition, the controller 1430 may control identifying the electricity charge budget information received from the server. Also, the controller 1430 may control predicting an electricity charge pattern for the specific period, based on the user's electricity usage history information received from the server, generating the electricity charge budget information for the specific period by adjusting the predicted electricity charge pattern, based on the target charge information, and identifying the generated electricity charge budget information.

Further, the controller 1430 may control simplifying the electricity usage history information, based on whether the user uses a variable rate system, and predicting the electricity charge pattern, based on the simplified electricity usage history information. In addition, the controller 1430 may control identifying ranking information based on a user's saving charge against a certain previous period in a similar group generated by extracting households being similar in characteristics to the user's household at the server, and displaying the received ranking information.

Further, the controller 1430 may control identifying information on the carbon emission amount generated based on a user's reduced electricity usage against a certain previous period at the server, and displaying the received carbon emission amount information.

Further, the controller 1430 may control identifying information and then displaying an item corresponding to the identified information on the display. The item corresponding to the identified information may include a first item corresponding to target charge information for a specific period inputted from the user, a second item corresponding to electricity charge budget information at a specific time point, and a third item corresponding to user's electricity charge information at the specific time point. The second item may be displayed on the basis of the ratio of the electricity charge budget information at the specific time point to the target charge information, based on a position of the first item. Also, the third item may be displayed on the basis of the ratio of the user's electricity charge information at the specific time point to the electricity charge budget information at the specific time point, based on the second item. The specific time point may include the current time point. The first and second items may indicate a fourth item, and the third item may occupy a portion of the fourth item. In addition, the fourth item may include a circular item.

In addition, the controller 1430 may control detecting a user's touch and drag from a fifth item, changing a displayed position of the fifth item in response to the detected touch and drag, and determining the user's target charge information based on the position of the fifth item. The item necessary for receiving the user's target charge information may include a sixth item indicating saving charge information compared to a past time point, based on the user's target charge information, and a seventh item corresponding to at least one other user's target charge information. The sixth item may be displayed to overlap with a portion of the fifth item, and the seventh item may be displayed to overlap with a portion of the sixth item. Also, the sixth item may be displayed in the form of bar.

Figure 15:
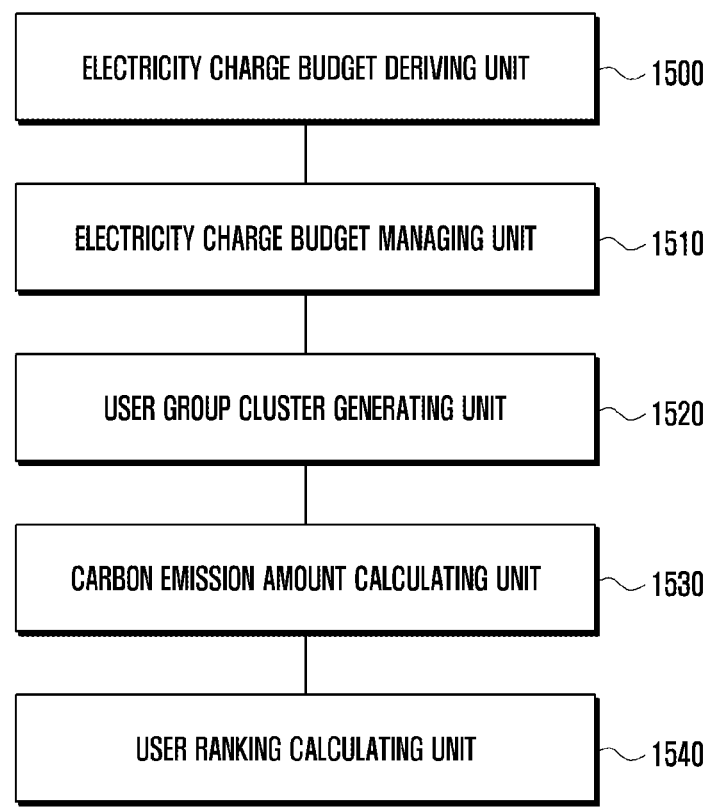
FIG. 15 is a block diagram illustrating a software structure installed in a controller of a server or terminal to generate energy usage status information according to an embodiment of the present invention.

FIG. 15 is a block diagram illustrating a software structure installed in a controller of a server or terminal to generate energy usage status information according to an embodiment of the present invention.

Specifically, if the energy is electricity, the controller of the server or terminal that generates electricity charge status information may include an electricity charge budget deriving unit 1500, an electricity charge budget managing unit 1510, a user group cluster generating unit 1520, a carbon emission amount calculating unit 1530, and a user ranking calculating unit 1540.

The electricity charge budget deriving unit 1500 may generate electricity charge budget information, based on the received electricity usage history information and the target charge inputted by the user. Also, the electricity charge budget managing unit 1510 may derive the current electricity charge budget information, based on the generated electricity charge budget information, and compare it with a user's current electricity charge.

In addition, the user group cluster generating unit 1520 may extract at least one household being similar in characteristics to the user's household from households existing in a certain area from the user, and thereby generate a similar group. Also, the user group cluster generating unit 1520 may extract households using the same zip code as the user and thereby generate a neighbor group. Further, the user group cluster generating unit 1520 may receive, from the user, information on a specific object desired to be compared for an electricity charge, and thereby generate a friend group including the at least one specific object.

Further, the carbon emission amount calculating unit 1530 may calculate the carbon emission amount, based on the saving usage obtained by comparing a user's current electricity charge or a target charge with electricity usage at a predetermined past time point. The carbon emission amount may be calculated by a predetermined equation, based on the saving usage.

In addition, the operations performed by the respective units included in the software structure may be also performed by the controller of the server or terminal.

While the present invention has been particularly shown and described with reference to exemplary embodiments thereof, it is clearly understood that the same is by way of illustration and example only and is not to be taken in conjunction with the present invention. It will be understood by those skilled in the art that various changes in form and details may be made therein without departing from the subject matter and scope of the present invention.

The invention claimed is:

1. A method for managing energy consumption by a server, the method comprising:
   receiving, from a terminal, user's target charge information for a specific period;
   predicting an energy charge pattern, based on a user's energy usage history information;
   generating energy charge budget information for the specific period, based on the energy charge pattern and the target charge information;
   receiving, from at least one gateway, information on characteristics of each household, the characteristics of each household comprising at least one from among a size of a building and ages of household members;
   generating group information based on the characteristics of each household; and
   transmitting, to the terminal, the energy charge budget information and the group information; and
   generating ranking information, based on a user's saving charge against energy charge information of a given previous period and saving charge information of other users in the group in the given previous period, and transmitting the ranking information to the terminal,
   wherein the transmitting the energy charge budget information further comprises, based on an energy usage rate of the user being increased to a predetermined rate or more, transmitting a notification to the user of a possibility of exceeding a user's target charge.

2. The method of claim 1, wherein the generating the energy charge budget information further comprises:
   adjusting the predicted energy charge pattern, based on the target charge information; and
   determining the adjusted energy charge pattern as the energy charge budget information.

3. The method of claim 2, wherein the generating the energy charge budget information by adjusting the predicted energy charge pattern, based on the target charge information, comprises:
   calculating a ratio of the target charge to a total energy charge for the specific period according to the predicted energy charge pattern; and
   generating the energy charge budget information for the specific period by reflecting the calculated ratio on the predicted energy charge pattern.

4. The method of claim 1, wherein the energy charge budget information comprises energy charge information distributed by time and by day to achieve a target charge for the specific period.

5. The method of claim 1, further comprising:
   generating information on a carbon emission amount based on a user's reduced electricity usage against a given previous period; and
   transmitting the generated carbon emission amount information to the terminal.

6. A method for managing energy consumption by a terminal, the method comprising:
   transmitting, to a server, user's target charge information for a specific period;
   receiving, from the server, energy charge budget information for the specific period and group information;
   receiving, from the server, ranking information based on a user's saving charge against a given previous period in a group and saving charge information of other users in the group in the given previous period; and
   displaying the energy charge budget information, the group information and user's current energy charge information on a display,
   wherein the energy charge budget information is generated based on an energy charge pattern and the target charge information, and the group information is generated based on characteristics of each household, the characteristics of each household comprising at least one from among a size of a building and ages of household members,
   wherein the receiving the energy charge budget information further comprises, based on an energy usage rate of the user being increased to a predetermined rate or more, receiving a notification that notifies the user of a possibility of exceeding a user's target charge.

7. The method of claim 6, wherein the identifying of the energy charge budget information comprises:
   generating the energy charge budget information for the specific period by adjusting the predicted energy charge pattern, based on the target charge information; and
   identifying the generated energy charge budget information.

8. The method of claim 7, wherein the generating the energy charge budget information by adjusting the predicted energy charge pattern, based on the target charge information, further comprises:
   calculating a ratio of the target charge to a total energy charge for the specific period according to the predicted energy charge pattern; and
   generating the energy charge budget information for the specific period by reflecting the calculated ratio on the predicted energy charge pattern.

9. The method of claim 6, wherein the energy charge budget information comprises energy charge information distributed by time and by day to achieve a target charge for the specific period.

10. A server for managing energy consumption, comprising:
    a transceiver configured to transmit and receive information; and
    a controller configured to:

control receiving, from a terminal, user's target charge information for a specific period,
predict an energy charge pattern, based on a user's energy usage history information,
generate energy charge budget information for the specific period, based on the energy charge pattern and the target charge information,
control receiving, from at least one gateway, information on characteristics of each household, the characteristics of each household comprising at least one from among a size of a building and ages of household members,
generate group information based on the characteristics of each household,
control transmitting, to the terminal, the energy charge budget information and the group information, and
generate ranking information based on a user's saving charge against energy charge information of a given previous period and saving charge information of other users in the group in the given previous period, and transmit the ranking information to the terminal,
wherein the controller is further configured to, based on an energy usage rate of the user being increased to a predetermined rate or more, transmit a notification to the user of a possibility of exceeding a user's target charge.

11. A terminal for managing energy consumption, comprising:
a transceiver configured to transmit and receive information;
a display configured to display information for managing the energy consumption; and
a controller configured to:
control transmitting, to a server, user's target charge information for a specific period,
control receiving, from the server, energy charge budget information for the specific period and group information,
control displaying the energy charge budget information, the group information and user's current energy charge information on the display, and
control receiving, from the server, ranking information based on a user's saving charge against a given previous period in a group and saving charge information of other users in the group in the given previous period,
wherein the energy charge budget information is generated based on an energy charge pattern and the target charge information, and the group information is generated based on characteristics of each household, the characteristics of each household comprising at least one from among a size of a building and ages of household members, and
wherein the controller is further configured to, based on an energy usage rate of the user being increased to a predetermined rate or more, receive a notification that notifies the user of a possibility of exceeding a user's target charge.

* * * * *